United States Patent
Helms et al.

(10) Patent No.: US 11,935,431 B1
(45) Date of Patent: Mar. 19, 2024

(54) LEARNING GAME SYSTEM AND METHODS OF GAMEPLAY

(71) Applicants: Christopher M. Helms, Roswell, GA (US); William Edwin Helms, Jasper, GA (US); Grayson M. Helms, Roswell, GA (US); Landon C. Helms, Roswell, GA (US)

(72) Inventors: Christopher M. Helms, Roswell, GA (US); William Edwin Helms, Jasper, GA (US); Grayson M. Helms, Roswell, GA (US); Landon C. Helms, Roswell, GA (US)

( * ) Notice: Subject to any disclaimer, the term of this patent is extended or adjusted under 35 U.S.C. 154(b) by 0 days.

(21) Appl. No.: 18/373,363

(22) Filed: Sep. 27, 2023

Related U.S. Application Data

(60) Provisional application No. 63/412,846, filed on Oct. 3, 2022.

(51) Int. Cl.
| | |
|---|---|
| *G09B 7/04* | (2006.01) |
| *A63H 33/26* | (2006.01) |
| *A63F 13/235* | (2014.01) |
| *A63F 13/45* | (2014.01) |
| *G09B 7/02* | (2006.01) |
| *G09B 7/06* | (2006.01) |

(52) U.S. Cl.
CPC ............... *G09B 7/04* (2013.01); *A63H 33/26* (2013.01); *A63F 13/235* (2014.09); *A63F 13/45* (2014.09); *A63H 2200/00* (2013.01); *G09B 7/02* (2013.01); *G09B 7/06* (2013.01)

(58) Field of Classification Search
CPC .... G09B 7/04; G09B 7/06; G09B 7/02; A63F 13/235; A63F 13/45; A63H 2200/00; A63H 33/26
See application file for complete search history.

(56) References Cited

U.S. PATENT DOCUMENTS

| | | | | |
|---|---|---|---|---|
| 5,364,108 | A * | 11/1994 | Esnouf | A63F 13/45 |
| | | | | 434/323 |
| 5,519,433 | A * | 5/1996 | Lappington | H04N 21/8545 |
| | | | | 348/478 |
| 6,800,031 | B2 * | 10/2004 | Di Cesare | A63F 13/332 |
| | | | | 463/40 |
| 2004/0054826 | A1 * | 3/2004 | Kavanagh | A63F 13/95 |
| | | | | 710/62 |

(Continued)

*Primary Examiner* — Jack Yip
(74) *Attorney, Agent, or Firm* — H. Brock Kolls

(57) ABSTRACT

The present invention relates to a learning game system that comprises a plushy having an internal chamber and a control system that is fitted into the internal chamber. The control system comprises a microcontroller, one or more memory, an impact sensor, and a user interface. During gameplay, a person catching the ball is detected by way of the impact sensor. The person is presented with a question that can be from a variety of school subjects, trivia, or other types of questions. An answer is received from the person by way of the user interface. A determination can be made if the answer is correct or incorrect. The person is prompted to toss the ball to another game-playing person. Game content such as questions can be downloaded, interchanged, or otherwise changed to cover a variety of subject matter areas and be progressively challenging to gameplayers of all ages.

22 Claims, 17 Drawing Sheets

(56) References Cited

U.S. PATENT DOCUMENTS

| | | | |
|---|---|---|---|
| 2004/0248567 A1* | 12/2004 | Sigurdsson | G09B 7/02 348/E5.103 |
| 2004/0263494 A1* | 12/2004 | Poor | G06F 1/163 345/204 |
| 2005/0026699 A1* | 2/2005 | Kinzer | A63F 3/00006 463/43 |
| 2005/0070361 A1* | 3/2005 | Lau | H03M 5/12 348/E5.103 |
| 2005/0227764 A1* | 10/2005 | Cantu | A63F 13/85 463/37 |
| 2006/0111183 A1* | 5/2006 | MacIver | A63F 13/42 463/36 |
| 2006/0111185 A1* | 5/2006 | MacIver | A63F 13/42 463/36 |
| 2008/0014835 A1* | 1/2008 | Weston | A63F 9/24 446/484 |
| 2009/0051653 A1* | 2/2009 | Barney | A63F 13/822 345/158 |
| 2009/0322761 A1* | 12/2009 | Phills | G06T 13/00 455/566 |
| 2012/0211940 A1* | 8/2012 | Schneider | A63H 5/00 273/138.2 |
| 2015/0217188 A1* | 8/2015 | Houvener | A63F 13/98 463/7 |
| 2016/0231896 A1* | 8/2016 | Potts | G06F 3/04812 |
| 2017/0189804 A1* | 7/2017 | Akavia | A63H 3/52 |
| 2019/0329125 A1* | 10/2019 | Peretz | H04M 1/72427 |
| 2020/0175046 A1* | 6/2020 | Wang | G06F 16/358 |
| 2023/0285846 A1* | 9/2023 | Peretz | A63F 9/18 345/156 |

\* cited by examiner

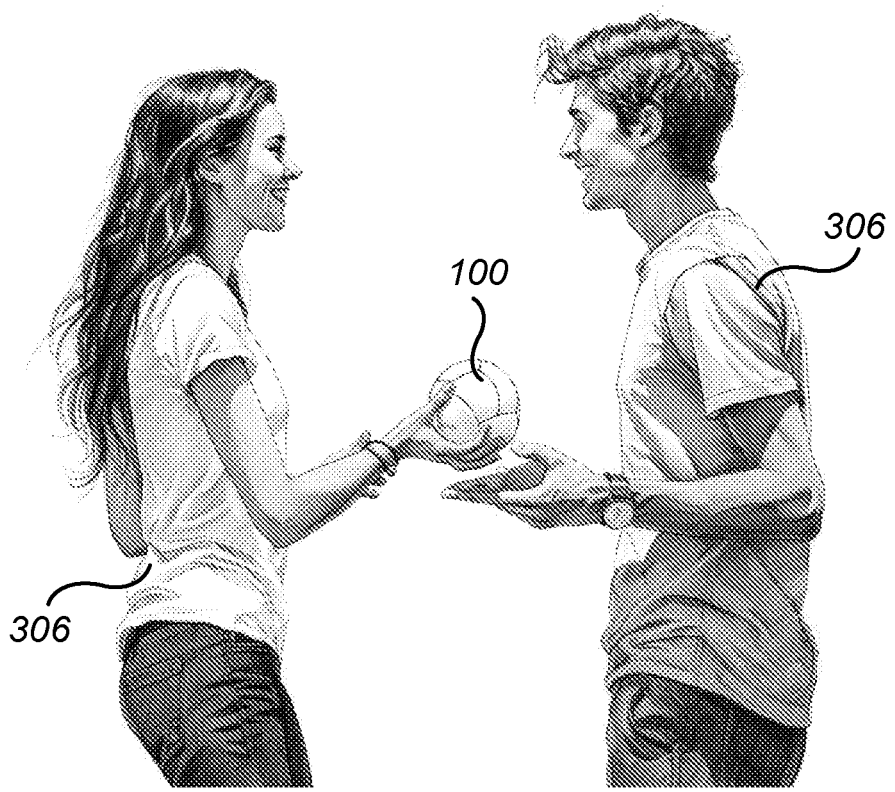
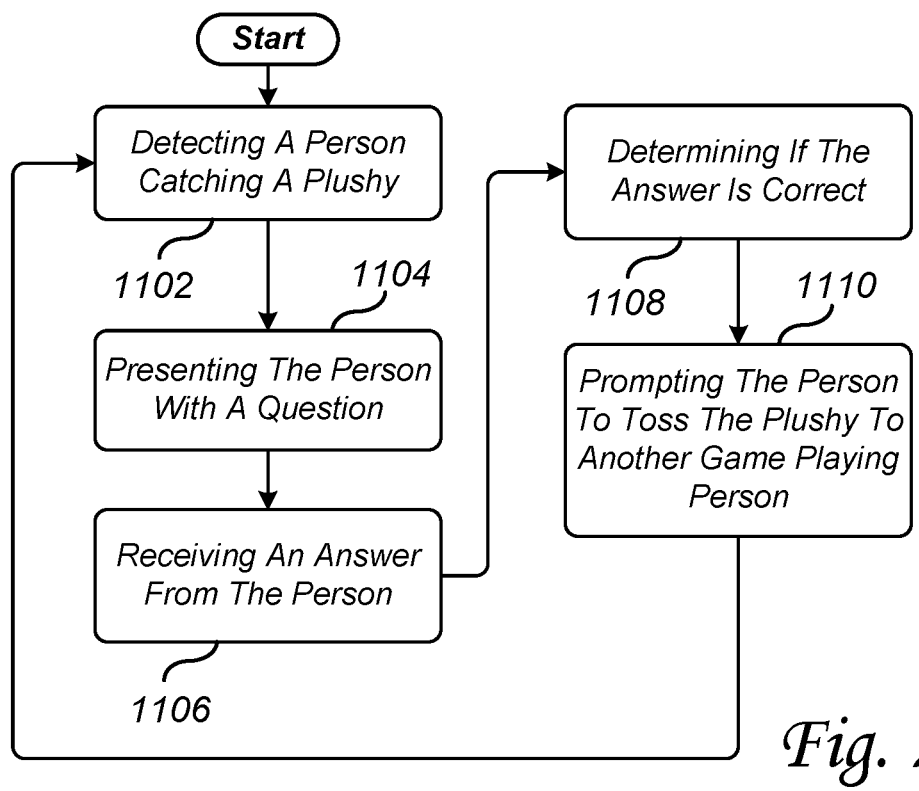
Fig. 2

Configuring The Learning Game System For Gameplay In A Classroom By:

1202 — Selecting For Gameplay By The Educator A Gameplay Learning Module, At Least One Of A Gameplay Task Associated With The Gameplay Module, And At Least One Gameplay Skill Level Associated With The Gameplay Task 1204 — Retrieving Questions And Answers From A Question And Answer Database 1206 — Receiving The Questions And Answers At The Plushy Control System

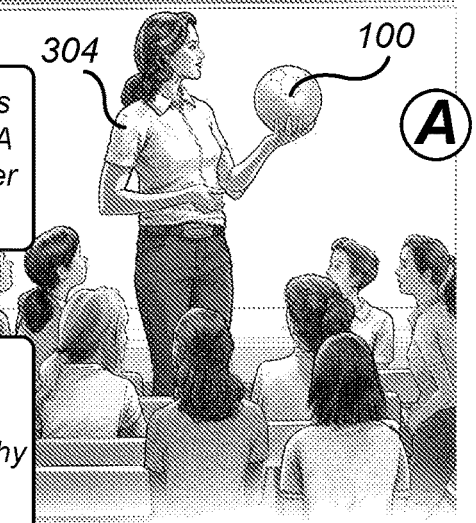

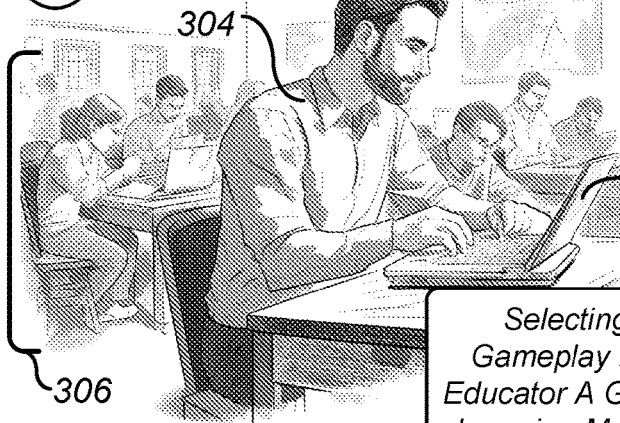

B — 304, 306, 222

Configuring The Learning Game System For Remote Classroom Learning By: 1302

1302 — Creating A Classroom Recordset

1304 — Selecting For Gameplay By The Educator A Gameplay Learning Module, At Least One Of A Gameplay Task Associated With The Gameplay Module, And At Least One Gameplay Skill Level Associated With The Gameplay Task 1306 — Retrieving Questions And Answers From A Question And Answer Database 1308 — Communicating The Plurality Of Questions And Answers To Each Of The Control System Associated With Each Of The Plushy Identification Withing The Classroom Recordset

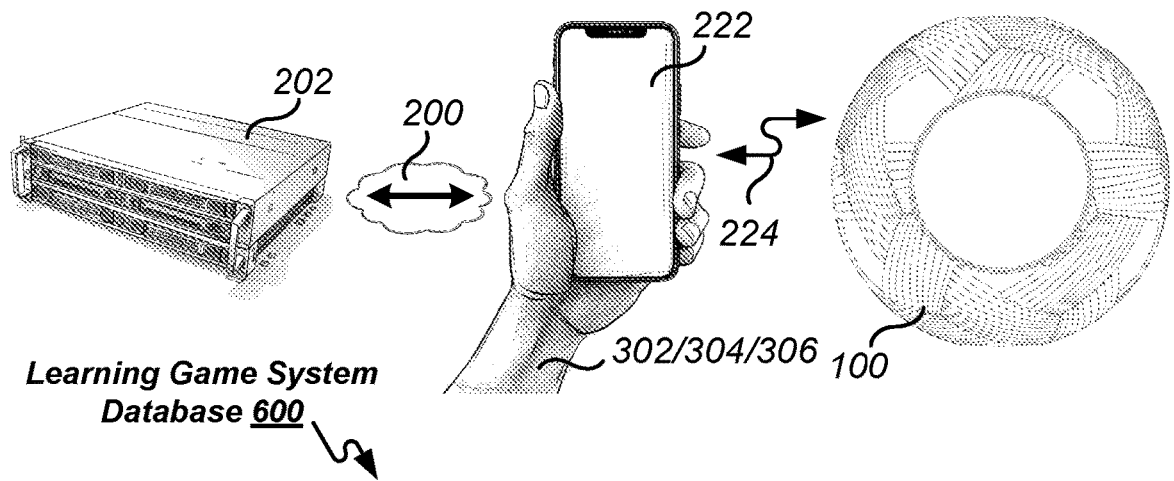
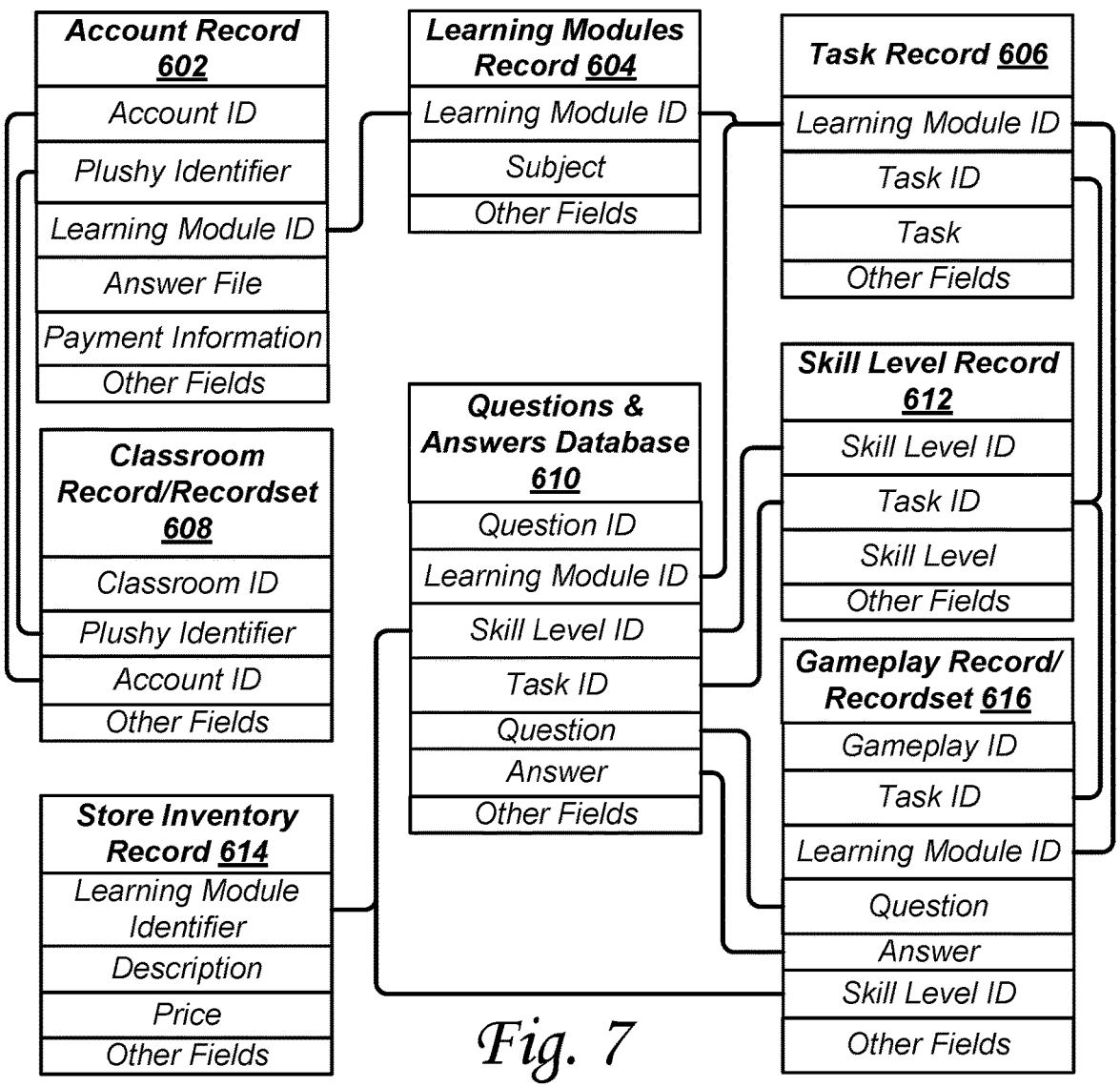
Fig. 7

LEARNING GAME SYSTEM AND METHODS OF GAMEPLAY

CROSS-REFERENCE TO RELATED APPLICATIONS

This application contains subject matter which is related to the subject matter of the following application. The below-listed application is hereby incorporated herein by reference in its entirety:

This is a U.S. non-provisional application that claims the benefit of a U.S. provisional application, Ser. No. 63/412,846, inventor Christopher M. Helms et al., entitled "LEARNING GAME DEVICE AND METHODS OF GAMEPLAY", filed Oct. 3, 2022.

TECHNICAL FIELD OF THE INVENTION

This invention relates to a learning game system, and particularly to a plushy gameplay device configured to ask questions and receive answers from a game player. The plushy is web-enabled and works in combination with a computing device and a server. The plushy facilitates a gameplay sequence between one or more players to promote the learning of math, science, geography, trivia, and other subjects.

BACKGROUND OF THE INVENTION

Before our invention, it was common for parents and teachers to play learning games with their children to teach math, science, and other subjects. Such learning games could be learning multiplication tables, spelling words, or other subject matter material. A key to effective learning can be to keep the child's focus and attention. Such prior games were most often effectuated by workbooks, flashcards, or simply asking questions.

There is a long-felt need for a question-and-answer gamification of learning for one or more game players that applies to all age groups and subject matter and is adaptable and extendable for use in homes, classrooms, remote learning, individual learning gameplay, and team learning gameplay environments that gives rise to the present invention.

SUMMARY OF THE INVENTION

The shortcomings of the prior art are overcome and additional advantages are provided through the provision of a learning game system that can comprise a plushy that has an internal chamber, and a control system that is fitted into the internal chamber. The control system can comprise a microcontroller, a memory, a communication interface, an impact sensor, and an audio amplifier that is operationally related to a speaker, amplifier/speaker. The memory, the communication interface, the impact sensor, and the audio amplifier are operationally related to the microcontroller.

The memory is encoded with instructions that when executed by the microcontroller perform the steps of receiving at least one question and at least one answer at the control system by way of the communication interface from a computing device. The control system by way of the communication interface, the computing device, and the server data communicate with each other.

The learning game system is then played by detecting, by way of the impact sensor, a catch of the plushy by at least one person who is playing the game. Then announcing when the catch occurs, by way of the speaker, one of the questions. After announcing one of the questions waiting to detect, by way of the impact sensor, a shake of the plushy by the person. Continuing then by announcing, when the shake occurs, by way of the speaker, the answer to the question. And, returning to the step of detecting, by way of the impact sensor, the catch of the plushy, until all of the questions have been asked or a predetermined gameplay time period expires. In operation, question-and-answer gameplay continues by repeatedly tossing and catching the plushy between each of the people playing the learning game.

Additional shortcomings of the prior art are overcome and additional advantages are provided through the provision of a learning game system that comprises a plushy having an internal chamber, and a computing device that comprises a microprocessor, a first memory, and a first communication interface. The first memory and the first communication interface are operationally related to the microprocessor.

The first memory is encoded with instructions that when executed by the microprocessor configure the learning game system by creating, by way of a user, an account record on the computing device or a server by way of the computing device. The account record comprises a plushy identifier field, at least one module field, at least one task field, and at least one skill level field. Then continuing by storing in the plushy identifier field a unique plushy identification, storing in the learning module field the user selected one or more learning module, storing in the task field the user selected one or more task for selected each of the learning module selected, and storing in the skill level field a skill level selected by the user for each of the task selected.

The learning game system is then configured for gameplay by selecting gameplay from the account record, by the user by way of the computing device, at least one gameplay learning module from the learning module field, and at least one gameplay task from the task field. Then continuing by, retrieving from a question-and-answer database plurality of the question and the answer based on the gameplay learning module, the gameplay task, and the skill level selected associated with the gameplay task. The question-and-answer database can be stored on the computing device 222 or on the server 202.

A control system is associated with the plushy identification and is fitted into the internal chamber. The control system comprises a microcontroller, a second memory, a second communication interface, an impact sensor, and an audio amplifier that is operationally related to a speaker. The second memory, the second communication interface, the impact sensor, and the audio amplifier are operationally related to the microcontroller.

The second memory is encoded with instructions that when executed by the microcontroller perform the steps of receiving at least one of the questions and at least one of the answers by way of the second communication interface from the first communication interface. The control system by way of the second communication interface, the computing device by way of the first communication interface, and the server data communicate with each other.

The learning game system is then played by detecting, by way of the impact sensor, a catch of the plushy by at least one of the people who is playing, announcing when the catch occurs, by way of the speaker, one of the question, detecting after announcing one of the question, by way of the impact sensor, a shake of the plushy by the person, announcing when the shake occurs, by way of the speaker, the answer to the question, and returning to the step of detecting, by way of the impact sensor, the catch of the plushy, until all of the question have been asked or a predetermined time period expires. In operation, question-and-answer gameplay continues by repeatedly tossing the plushy between each of the people playing the learning game.

Additional shortcomings of the prior art are overcome and additional advantages are provided through the provision of a method of use of a learning game system, the method comprising the steps of configuring a learning game system by creating, by way of a user, an account record, on a computing device or on a server by way of the computing device. The account record comprises a plushy identifier field, at least one module field, at least one task field, and at least one skill level field.

The method continues by storing, by way of the computing device, in the plushy identifier field a plushy identification, storing in the learning module field the user selected one or more learning module, storing in the task field the user selected one or more task for selected each of the learning module selected and storing in the skill level field a skill level selected by the user for each of the task selected.

The method then continues by configuring the learning game system for gameplay by selecting for gameplay from the account record, by the user by way of the computing device, at least one gameplay learning module from the learning module field, and at least one gameplay task from the task field.

Continuing by retrieving from a question-and-answer database plurality of the question and the answer based on the gameplay learning module, the gameplay task, and the skill level selected associated with the gameplay task. The question-and-answer database is stored on the computing device or the server.

Continuing by receiving at least one of the questions and at least one of the answers at a control system from the computing device or the server. The control system, the computing device, and the server data communicate with each other. A plushy has an internal chamber, the control system is associated with the plushy identification and fitted into the internal chamber. The control system comprises a microcontroller, a memory, a communication interface, an impact sensor, and an audio amplifier that is operationally related to a speaker. The memory, the communication interface, the impact sensor, and the audio amplifier are operationally related to the microcontroller.

The method then continues by playing the learning game system by detecting, by way of the impact sensor, a catch of the plushy by at least one of a person who is playing, announcing when the catch occurs, by way of the speaker, one of the questions, detecting after announcing one of the questions, by way of the impact sensor, a shake of the plushy by the person, announcing when the shake occurs, by way of the speaker, the answer to the question, and returning to the step of detecting, by way of the impact sensor, the catch of the plushy, until all of the question have been asked or a predetermined time period expires. In operation, question-and-answer gameplay continues by repeatedly tossing and catching the plushy between each of the people playing the learning game.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 1-2 illustrates examples of a learning game system and methods of use;

FIG. 3 illustrates examples of configuring a learning game system for classroom methods of use;

FIG. 7 illustrates one example of a database structure for a learning game system and method of the present invention;

Figure 1:
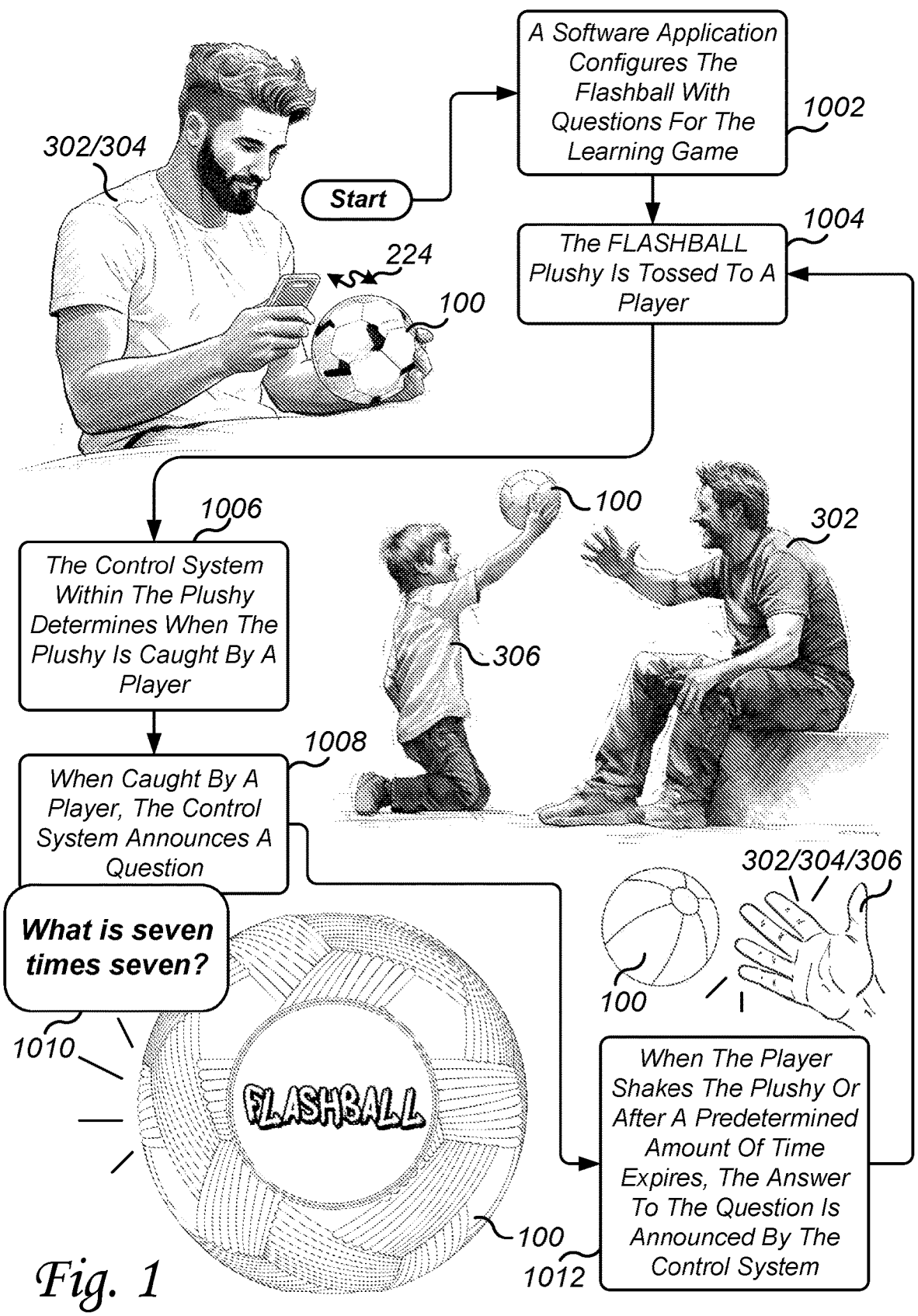

The detailed description explains the preferred embodiments of the invention, together with advantages and features, by way of example with reference to the drawings.

DETAILED DESCRIPTION OF THE INVENTION

The present invention relates to a learning game system and gameplay methods to promote learning by persons or users 306, such as students, of all ages but with an emphasis on children in elementary, middle school, and high school. In an exemplary embodiment, the learning game system can be focused on a subject, also referred to as a learning module, such as math, geography, science, trivia, or other subjects. Within each learning module can be a series of tasks that focus on a particular aspect of the broader learning module.

As an example, the learning module for math can include tasks such as addition, subtraction, multiplication, division, skip counting (count by 2, by 5, by 10, and other counts), and other math focus areas. In another example, the learning module of geography can include tasks such as States and capitals, state abbreviations, countries and capitals, and other focus areas. In another example, in the learning module of science, tasks can include the periodic table, vocabulary, and other science areas. In addition, other subject matter learning modules and tasks can be organized to include days of the week, months, holidays, presidents, and other focus areas without limitation.

Each task can be assigned a skill level. The Skill level setting for a task tailors the types of questions that will be asked to the appropriate age and educational level of the game players 306. Skill levels can be a numeric ranking such as 1 to 10 with one being easy and 10 being very hard or 1 to 100 or other suitable numbering schemes, or expressed as beginner, intermediate, expert, or other labels, or skill levels can be ranked in other ways, as may be required and/or desired in a particular embodiment.

In an exemplary embodiment, the results of the player's 306 gameplay can be remotely monitored by an administrator 304 such as a teacher also referred to as an educator, parent 302, or other authorized persons.

The learning game is played by passing the learning game device 100 also referred to as plushy 100 between game-playing persons 306. For disclosure purposes, user 302 can be parents, caregivers, or other similar users, user 304 can be educators, administrators, or other similar users, and user 306 can be students, kids, game players, or other similar users. In some embodiments that learning game may be played with users 306 only, other embodiments it may be played with users 302 and 306, and in other embodiments it may be played with users 302, 304, and 306. In general users or game players 302/304/306 is intended to mean while users have different roles (parent, educator, other) each at different times can also be a game player 306 or user 306 too, as may be required and/or desired in a particular embodiment.

For disclosure purposes, plushy 100 can also be referred to as learning game device 100.

When game player 306 receives the plushy 100 they are presented with a question. Once the question is answered the plushy 100 is passed to another game player 306. Learning games can be timed, limited to a certain number of questions between players 306, the first player 306 to achieve a certain score or level, placed in infinite game length where the game continues until the device is turned 'OFF', or administered in other ways, as may be required and/or desired in a particular embodiment. Such infinite gameplay can be useful in classrooms and other circumstances where an administrator/educator 304 such as a teacher wants to keep the game going around a classroom for a sustained period of time.

The learning game device 100 also referred to as the plushy 100 comprises a control system 110 that can data communicate locally and remotely across a global network 200 with computing devices 222, and remote data processing resources 202. A server can be a data processing resource 202 and can be referred to as server 202. The Internet can be a global network 200. In an exemplary embodiment, the plushy 100 can be an Internet-of-Things (IoT) device.

An advantage, in the present invention, is that one of the intents of the learning game system and methods of gameplay is to incorporate interactive learning with active movement by the game players 306 to also foster exercise and improvement in hand-eye coordination.

Turning now to the drawings in greater detail, it will be seen that in FIG. 1 there is illustrated one example of a learning game system and method of use. In an exemplary embodiment, the plushy 100 can comprise a soft shell 102 and a control system 110. The soft shell 102 can be any type, kind, size, or shaped ball including, soft plush, football, baseball, soccer, basketball, or other types and kinds of balls or shapes, as may be required and/or desired in a particular embodiment. In other embodiments, the ball is not limited to a ball shape and can for example be decorated to look like other shaped objects. Additionally, soft shell 102 can be decorated, as desired by the game players 306 to change the look, color, and shape, or to change other features of soft shell 102.

Figure 4:
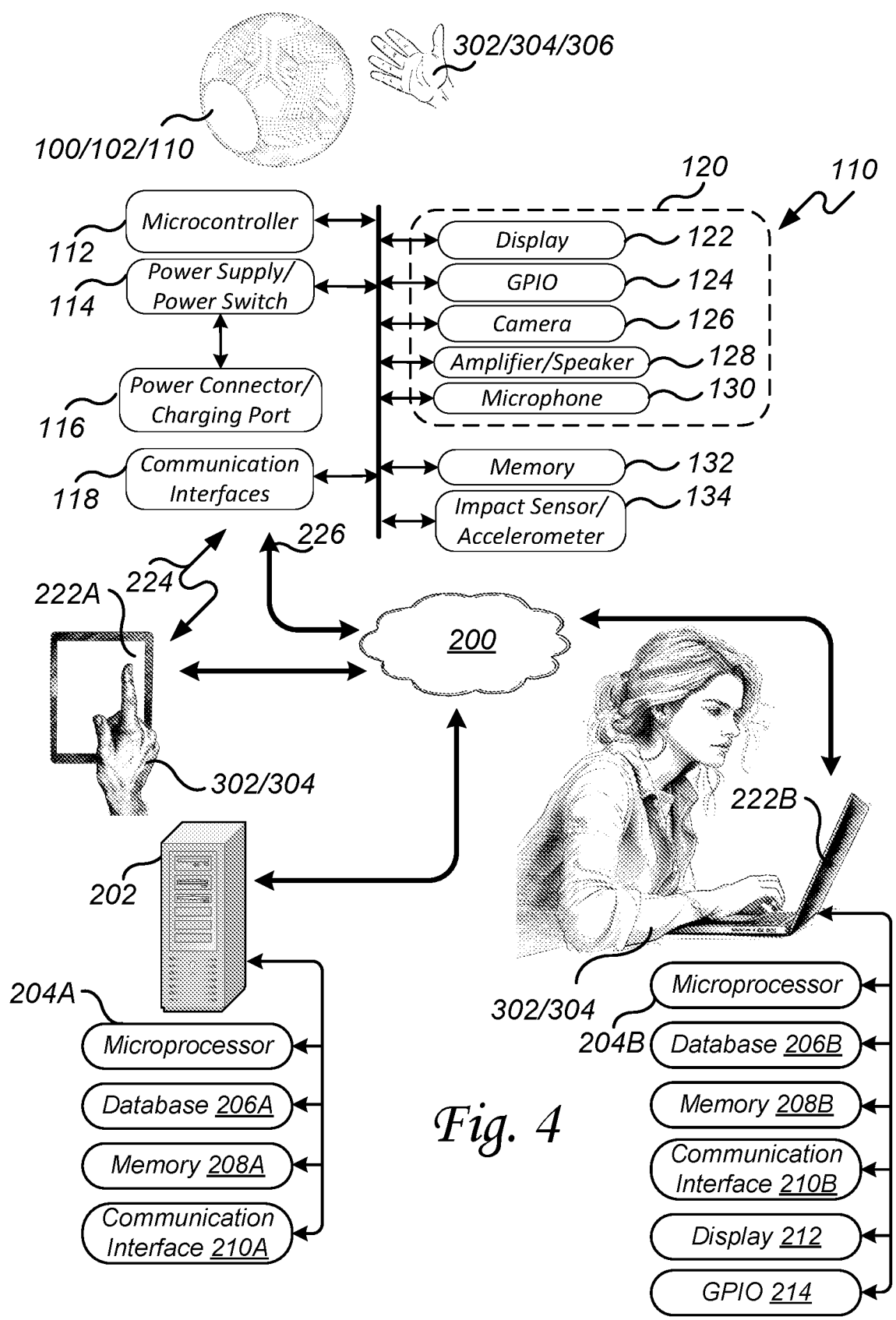
FIG. 4 illustrates one example of a control system block diagram of a learning game system and network diagram.

In an exemplary embodiment and with reference to FIG. 1 and at least FIG. 4, the method begins in step 1002 by configuring the FLASHBALL plushy 100. The plushy 100 comprises the control system 110 by way of a software application that is being executed on a computing platform 222 learning modules 604 access, tasks 606 selected, and questions and answers queried are queries from a question-and-answer database 610. The questions and answers are then data communicated 224 or otherwise downloaded wirelessly from the computing device 222 to the control system 110 that is within and part of plushy 100. The method then moves to step 1004.

In step 1004, the learning game begins by tossing the plushy to one of the game players 306. The method then moves to step 1006.

In step 1006, an impact sensor 134 and memory 132 are operationally related to microcontroller 112. By way of instruction encoded in the memory 132 and executed by the microcontroller 112 measurements from the impact sensor 134 allow a determination when the plushy 100 is caught by one of the game players 306. In an exemplary embodiment, the impact sensor 134 can be an accelerometer. The method then moves to step 1008.

In step 1008, when the plushy 100 is caught by one of the game players 306, the control system 110 announces by way of an amplifier/speaker 128 one of the questions that were previously downloaded 224 to the plushy 100 control system 110 from the computing device 222. In operation, the amplifier/speaker 128 is operationally related to the microcontroller 112. As an example, and not a limitation, the announced question might be as illustrated in 1010 "What is seven times seven?" referring to the multiplication math problem of 7×7. For disclosure purposes, with regard to the questions and answers, there is no particular limitation on the types, kinds, or subject matter that can be implemented, as may be required and/or desired in a particular embodiment. The method then moves to step 1012.

In step 1012, when the game player 306 shakes the plushy the control system 100 announces by way of the amplifier/speaker 128 the answer. In this regard, by way of instruction encoded in the memory 132 and executed by the microcontroller 112 measurements from the impact sensor 134 allow a determination when the plushy 100 is shaken by the game player 306. The answer can also be announced by the control system 110 and amplifier/speaker 128 when a predetermined answer time period elapses for example and not a limitation of 15 seconds or other duration. The predetermined answer time period can be a configuration setting that can be adjusted on the computing device 222 and downloaded 224 to the plushy 100 control system 110 as may be required and/or desired in a particular embodiment.

The learning game then continues by the method moving back to step 1004 until all the downloaded 224 questions have been asked, a predetermined gameplay time period has elapsed, or other game end criteria have been met.

Referring to FIG. 2 there is illustrated one example of a learning game system and method of use. In an exemplary embodiment with reference to FIG. 2 and at least FIGS. 4 and 6, the method begins in step 1102 where a game player 306 catching the plushy 100 is detected by way of an impact sensor 134. The plushy 100 comprises a soft shell 102 preferable fabric or other suitable material, and a control system 110. The soft shell 102 has an internal chamber 104. The control system 110 can be fitted into internal chamber 104. The control system 110 comprises a microcontroller 112, one or more memory 132, the impact sensor 134, a microphone 130, and an amplifier/speaker 128. The memory 132, the impact sensor 134, the microphone 130, and the amplifier/speaker are operationally related to the microcontroller 112. The method then moves to step 1104.

In step 1104, upon catching the plushy 100, the game player 306 is presented with a question by way of the amplifier/speaker 134. In this regard, by way of instructions encoded in the memory 132 and executed by the microcontroller 112 measurements from the impact sensor 134 allow a determination when the plushy 100 is caught by one of the game players 306. In an exemplary embodiment, the impact sensor 134 can be an accelerometer.

The method continues in step 1106 by receiving an answer from the game player 306 by way of the user interface 120 and in particular microphone 130. The method then moves to step 1108.

In step 1108, the answer is determined to be correct or incorrect by way of the control system 110. In this regard, the control system 110 determines if a spoken answer from the game player 306 is a correct answer or an incorrect answer by way of the microphone 130 and speech processing by way of the control system 110 comparing the spoken answer recorded by the microphone 130 to the answer that was downloaded along with the question from the computing device 222 at the beginning of the game. The method then moves to step 1110.

In step 1110, game player 306 having answered the question is prompted by an instruction spoken by the control system 110 by way of amplifier/speaker 128 to toss the plushy 100 to another game-playing person 306. The game then continues by returning to step 1002 to detect when the next game-playing person 306 catches the soft shell 102. Game play continues until all the questions have been asked, a predetermined time period elapses, recycling questions and playing as long as the game players 306 want, or determined by other conditions as may be required and/or desired in a particular embodiment.

In an exemplary embodiment, the plushy 100 can detect the impact difference between a game player 306 catching the plushy 100 and the plushy 100 being bounced on the ground, wall, ceiling, or other hard surfaces. In this regard, bouncing the plushy 100 can be a feature in a game such as one player 306 bouncing the plushy 100 to another player as a challenge for more points or a loss of points to go to the player 306 bouncing the ball if the question is missed, or other gameplay bounce interaction feature, as may be required and/or desired in a particular embodiment.

Referring to FIG. 3 there are illustrated examples of configuring a learning game system for in-classroom methods of use. In an exemplary embodiment reference 'A' illustrates one example of gameplay within the classroom. The method begins in step 1202 where an educator 304 selects from the available learning modules 604 and tasks 606 associated with the available learning modules a game gameplay module, a gameplay task associated with the gameplay module, and a gameplay skill level that is associated with the gameplay task. The method then moves to step 1204.

In step 1204, questions and answers from the question record 610 or questions and answers database 610 can be queried based on the gameplay learning module, gameplay task, and gameplay skill level and stored ahead of download to plushy 100 in the gameplay record or recordset 616. The method then moves to step 1206.

In step 1206, the gameplay record or gameplay recordset 616 can be data communicated from the computing device 222 to the control system 110 inside the plushy 100. The learning game is then configured and ready for classroom play.

In operation, the plushy 100 can be passed from student 306 to student 306. In the classroom, each time plushy 100 is caught a question is annunciated by the amplifier/speaker 130, and student 306 is given a time period to answer. After the student 306 answers aloud, they can shake plushy 100 to hear the answer annunciated by the amplifier/speaker 130. The game then continues with student 306 passing plushy 100 to a different student 306 as long as the game runs.

Referring to FIG. 3 there are illustrated examples of configuring a learning game system for out-of-classroom methods of use. In an exemplary embodiment reference 'B' illustrates one example of gameplay outside the classroom such as at home, in remote learning environments, after school events, or in other places. In this regard, configuring the learning game system for remote classroom learning begins in step 1302 creating a classroom recordset 608 that comprises a plurality of the account record, each of the account records in the classroom recordset 608 corresponds to one of the persons 306 also referred to as students 306 in a classroom. The classroom is administered by an educator 304. The method then moves to step 1304.

In step 1304, educator 304 uses a computing device 222 to select for gameplay at least one gameplay learning module from the available learning module, at least one gameplay task that is associated with the gameplay learning module, and at least one gameplay skill level that is associated with the gameplay task. The method then moves to step 1306.

In step 1306, questions and answers are retrieved or otherwise queried from a question-and-answer database 610 and stored ahead of download to plushy 100 in the gameplay record or recordset 616. The plurality of the questions and the answers are based on the gameplay learning module, the gameplay task, and the gameplay skill level selected. The question-and-answer database 610 can be stored on the computing device 222, on the server 202, on the control system 110 in memory 132, or other suitable locations. The method then moves to step 1308.

In step 1308, the plurality of the questions and the answers are data communicated to each of the control system 110 associated with each of the unique plushy identification within the classroom recordset 608. In this regard, the necessary information can reside on server 202 such that when the plushy 100 by way of control system 110 connects to the global network 200 receives the necessary updated and classroom recordset information including the questions and answers that the educator 304 selected for the classroom. In operation, educator 304 can assign or otherwise select the questions and answers to be used when student 306 plays the game out-of-the-classroom.

Referring to FIG. 4 there is illustrated one example of a control system 110 block diagram of a learning game device plushy 100 and a network diagram. In an exemplary embodiment, the plushy 100 can be web-enabled.

The term "web-enabled" or "web-enabled control system" or "web-enabled control system 110" in the present invention is intended to mean an Internet-of-things device. In this regard, a device that is capable of connecting a physical device such as plushy 100 to the digital world. State differently, web-enabling is equipping a device with the necessary electronics to be monitored, controlled, and data communicate locally and remotely with other data communicating devices 222. Such other data communicating devices 222 also referred to as computing devices 222 can be smartphones, tablets, laptops, other web-enabled devices, servers, and similar devices.

The computing devices 222 can comprise a microprocessor 204B, a database 206B, memory 208B, a communication interface 210B, a display 212, and a plurality of general-purpose inputs and outputs (GPIO) 214. Additionally, and as better illustrated in at least FIG. 5, the mobile type of computing device 222 (tablets, smartphones, and others) can comprise a global positioning system (GPS) 216, and a microphone and/or camera 218. In general, computing devices 232 can be configured with other functions and features, as may be required and/or desired in a particular embodiment.

Figure 5:
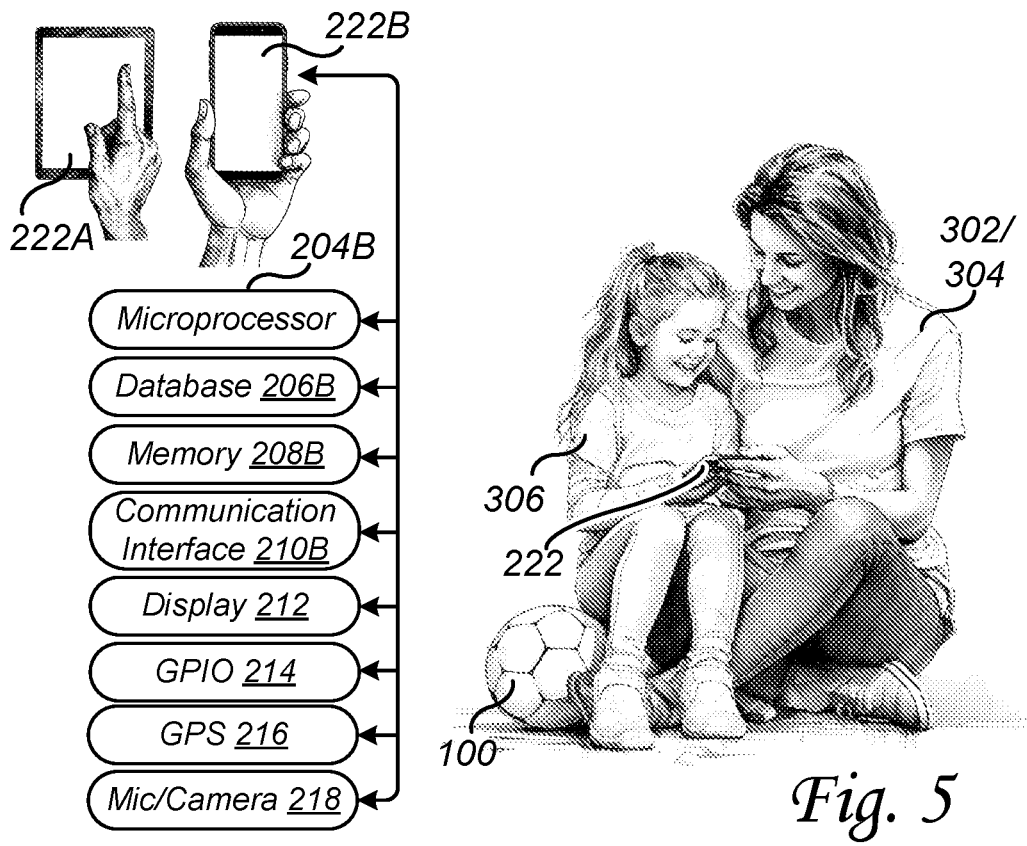
FIG. 5 illustrates one example of a computing device system block diagram.

With reference to FIG. 5, the microprocessor 204B is operationally related to database 206B, memory 208B, communication interface 210B, display 212, GPIO 214, and if equipped with GPS 216, and microphone and/or camera 218. The computing devices 222 each rely on a suitable power source which can include a rechargeable battery, external power supply, or other types and/or kinds of power sources.

Microcontroller 204B can be INTEL, ZILOG, MICROCHIP, AMD, ARM, and/or other types or kinds of microprocessors.

Database 206B can be SQL, MYSQL, MARIADB, ORACLE, MS ACCESS, network-accessible storage, flat files, a combination thereof, or other types and kinds of databases.

Memory 208B can be a combination of RAM, ROM, flash, hard drives, solid-state drives, USB flash drives, micro-SD cards, or other types of removable memory, and/or other types and kinds of memory.

The communication interfaces 210B can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

Display 212 can be a liquid crystal display (LCD), light emitting diode (LED), organic light emitting diode (OLED), or other types and kinds of displays.

The general-purpose inputs and outputs (GPIO) 214 can be TTL, CMOS, MOSFET, transistors, buffers, relays, pushbuttons, switches, and/or other types and kinds of GPIO circuits. In an exemplary embodiment, some of the GPIO 214 lines can be used to drive a touch screen input, biometric input devices, keyboards, and or types and kinds of computing device input devices.

Global positioning system (GPS) device 216 can be used to determine the geographic location of patents/administrators/players 302/304/306 who are carrying a computing device 232 equipped with a GPS 216. In this regard, such computing devices 232 are typically mobile computing devices such as tablets 222A, smartphones 222B, and other similar types and/or kinds of mobile computing devices 222.

Microphone and/or camera 218 can be used to record audio, and video, and take pictures. In this regard, users 302/304/306 can use their computing devices equipped with a microphone and/or camera 218 to make digital media records that can be selectively shared on social media and other digital media outlet locations.

With reference to FIG. 4, the data processing resource 202 can be a server, network storage device, or other types and kinds of data processing resources. Such data processing resources can be AMAZON WEB SERVICES (AWS), MICROSOFT AZURE, or other types and kinds of hosted data processing resource services. For disclosure purposes, a remote data processing resource 202 can also be referred to as server 202.

The data processing resource 202 can comprise a microprocessor 204A, a database 206A, memory 208A, and a communication interface 210A. The microprocessor 204A is operationally related to database 206A, memory 208A, and communication interface 210A.

The microcontroller 204A can be INTEL, ZILOG, MICROCHIP, AMD, ARM, and/or other types or kinds of microprocessors.

The database 206A can be SQL, MYSQL, MARIADB, ORACLE, MS ACCESS, network accessible storage, flat files, a combination thereof, or other types and kinds of databases.

The memory 208A can be a combination of RAM, ROM, flash, hard drives, solid-state drives, USB flash drives, micro-SD cards, or other types of removable memory, and/or other types and kinds of memory.

The communication interfaces 210A can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In operation, computing devices 222, plushy 100, and other data communicating devices can data communicate with remote data processing resources 202 and utilize data storage resources such as database 206A. Such remote data processing resources 202 can be a server or other types and kinds of data processing resources. Furthermore, computing devices 222, remote data processing resources 202, data storage resources 206A, plushy 100, and other types and kinds of data communicating devices can data communicate over a global network 200. The global network 200 can be the Internet.

In an exemplary embodiment, gameplay statistics and other data for each player 306 can be data communicated and stored on a remote data processing resource 202 and/or associated database 206A. Players' 306 learning performance can be remotely monitored by an administrator 304. Such administrators 302/304 can be teachers, homeschool parents, caregivers, parents, or other authorized people. Additionally, learning plans including subject matter, question difficulty level, and other features and aspects of the game can be predetermined by the administrator 304 and downloaded as appropriate and if necessary to the plushy 100, as may be required and/or desired in a particular embodiment.

In an exemplary embodiment, an administrator 302/304 such as a homeschool parent, teacher, parent, caregiver, or other can download questions to the learning game device 100. In this regard, spelling words, math problems, quiz review questions, study guide questions, and other types and kinds of questions can be selected by administrator 304 and downloaded to the learning game device 100 as the gameplay question set. In this manner, game player 306 can review the most relevant questions in preparation for school tests and quizzes.

In an exemplary embodiment, game questions and content can be downloaded from APPLE, GOOGLE, or other Play Stores. In operation, the parents 302, gameplayers 306, administrator 304, or other intervention can initiate a download from a Play Store to the learning game device 100. Such downloading can be from a computing device 222 to the plushy 100 control system 110, to the control system 110 from server 202, or by other data communication paths as may be required and/or desired in a particular embodiment.

In an exemplary embodiment, plushy 100 can be equipped with a web-enabled control system 110. Such a web-enabled control system can comprise a microcontroller 112 which is operationally related to a power supply 114, a plurality of communication interfaces 118, a display 122, a general-purpose inputs and outputs (GPIO) interface 124, a camera 126, an amplifier/speaker 128, a microphone 130, one or more memory 132, and an impact sensor/accelerometer 134 also referred to as impact sensor 134.

The microcontroller 112 can be an INTEL, ZILOG, MICROCHIP, AMD, ARM, and/or other types or kinds of microcontrollers.

The communication interfaces 118 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The power supply/power switch 114 can be a disposable battery, rechargeable battery, and/or other types and kinds of power supplies. In an exemplary embodiment, a power switch can be implemented with the power supply so that game player 306 can manually turn 'ON'/'OFF' the plushy 100. In other exemplary embodiments, a first impact detected by the impact sensor 134 can be used to wake or otherwise turn 'ON' the device, and/or a non-activity (no impacts detected by the impact sensor 134) for a predetermined time period can be interpreted as device non-use and the plushy 100 can turn itself 'OFF' or otherwise enter a sleep mode.

The power supply 114 can further comprise a charging port 116 for receiving an electric charge to charge one or more rechargeable batteries or providing an electric charge to charge an external device such as a smartphone or other device.

The display 122 can be an LCD, OLED, LED, a combination thereof, and/or other types and kinds of displays.

The general purpose inputs and outputs (GPIO) 124 can be TTL, CMOS, transistors, buffers, relays, pushbutton, switches, and/or other types and kinds of GPIO circuits.

The amplifier and speaker 128 also referred to as amplifier/speaker 130 aren't particularly limited and can be any suitable combination of an amplifier and speaker that can be configured to operationally work with microcontroller 112 to play analog or digital audio clips, as may be required and/or desired in a particular embodiment.

The camera 126 can be integrated into the surface of soft shell 102, or configured in other ways. The type of camera 126 is not particularly limited and can be any suitable camera as may be required and/or desired in a particular embodiment.

The memory 132 can be a combination of RAM, ROM, flash, hard drives, solid-state drives, USB flash drives, SD cards, micro-SD cards, thumb drives, permanent, removable, a combination thereof, and/or other types and kinds of memory.

The impact sensor 134 can be an accelerometer, mercury switch, passive infrared sensor (PIR) motion sensor, infrared, thermal, Doppler radar, ultrasonic, capacitance, touch-type, optical, Hall effect switch, a combination thereof, and/or other types and kinds of impact sensors.

A user interface 120 can be formed by one or more of the following: a display 122, a GPIO 124, a camera 126, an amplifier/speaker 128, or a microphone 130 as may be required and/or desired in a particular embodiment.

In operation, in an exemplary embodiment, the soft shell 102 can be equipped with a web-enabled control system 110 so that the plushy 100 also referred to as the learning game device 100 can be remotely monitored, controlled, remotely data communicated with, rely on remote data processing resources for gameplay content and other, and data communicated with for other purposes. Such remote monitoring and control can be effectuated by the game players 302, and/or others as may be required and/or desired in a particular embodiment.

In an exemplary embodiment, a learning game system can comprise a plushy 100 that has an internal chamber 104 and a control system 110 that is fitted into the internal chamber 104. The control system 110 can comprise a microcontroller 112, a memory 132, a communication interface 118, an impact sensor 134, and an audio amplifier that is operationally related to a speaker, amplifier/speaker 128. The memory 132, the communication interface 118, the impact sensor 134, and the audio amplifier 128 are operationally related to the microcontroller 112.

The memory 132 can be encoded with instructions that when executed by the microcontroller 112 perform the steps of receiving at least one question and at least one answer at the control system 110 by way of the communication interface 118 from a computing device 222. The control system 110 by way of the communication interface 118, the computing device 222, and the server 202 data communicate with each other.

The learning game system is then played by detecting, by way of the impact sensor 134, a catch of the plushy 100 by at least one person 306 who is playing the game. Then announcing when the catch occurs, by way of the speaker, one of the questions. After announcing one of the questions waiting to detect, by way of the impact sensor, a shake of the plushy by the person. Continuing, by announcing when the shake occurs, by way of the speaker, the answer to the question. And, returning to the step of detecting, by way of the impact sensor, the catch of the plushy, until all of the questions have been asked or a predetermined gameplay time period expires. In operation, question-and-answer gameplay continues by repeatedly tossing and catching the plushy between each of the people playing.

In an exemplary embodiment, a computing device 222 can comprise a microprocessor 204B, a memory 208B, and a communication interface 210B. The memory 208B and the communication interface 210B are operationally related to the microprocessor 204B.

The memory 208B can be encoded with instructions that when executed by the microprocessor 204B configure the learning game system by creating, by way of a user 302/304/306, an account record 602, on the computing device 222 or the server 202 by way of the computing device 222. The account record 602 comprises a plushy identifier, at least one of a module field, at least one of a task field, and at least one of a skill level field, The control system 110 can be associated with the plushy identification.

Configuration continues by storing the user 302/304/306 provided name of the plushy 100 in the plushy identifier field and/or storing in the plushy identifier field a plushy identification. Continuing, by storing in the learning module field the user selected one or more learning modules, storing in the task field the user 302/304/306 selected one or more tasks for each of the learning modules selected, and storing in the skill level field a skill level selected by the user 302/304/306 for each of the tasks selected.

In an exemplary embodiment, the memory 132 can be encoded with instructions that when executed by the microcontroller 112 perform the steps of recording an answer file as spoken by the person 306 answering the question, by way of a microphone 132. The answer file comprises the question in text or audible format and the answer in audible format or converted text from the audible format. The answer file is then communicated to the computing platform 222 by way of the communication interface 118. The answer file can be stored and associated with the account record 602 so that it can be retrieved used and reviewed at future times.

In an exemplary embodiment, the memory 132 can be encoded with instructions that when executed by the microcontroller 112 perform the steps of determining if a spoken answer from person 306 is a correct answer or an incorrect answer by way of a microphone 130 and speech processing by way of the control system 110 comparing the spoken answer to the answer. If the correct answer is affirmed a score can be incremented or otherwise credited as appropriate by the control system 110. The score can be data communicated to the computing platform 222, by way of the communication interface 118 and the score stored and associated with the account record 602 so that it can be retrieved used, and reviewed at a future time.

In an exemplary embodiment, questions missed can be queued or otherwise stored to be re-asked later in the game. Additionally, gameplay can continue until a predetermined time period elapses, a predetermined number of questions are asked, a score of a certain amount if achieved, or game length can be determined in other suitable ways as may be required and/or desired in a particular embodiment.

Figure 6:
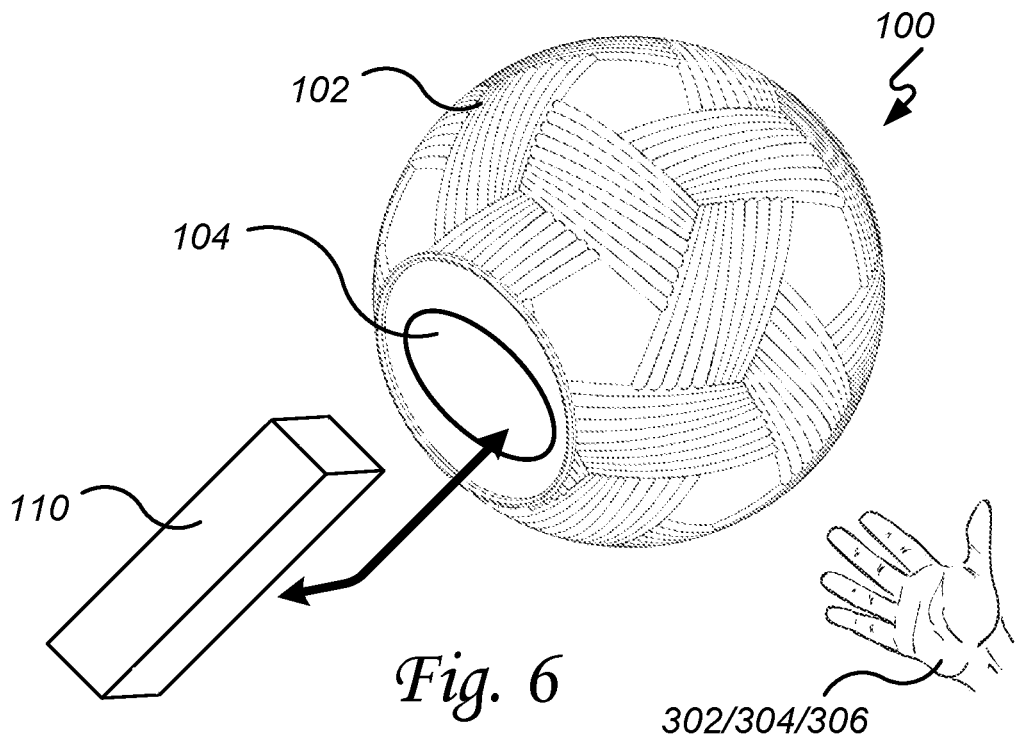
FIG. 6 illustrates one example of a plushy learning game device.

Referring to FIG. 6 there is illustrated one example of a learning game device 100 also referred to as plushy 100. In an exemplary embodiment, a plushy 100 can comprise a soft shell 102 having an internal chamber 104, and a control system 110 that is fitted into the internal chamber 104. A flap fastened by hook-and-loop, a zipper, or other suitable can be used to cover or otherwise seal the control system 100 inside the soft shell 102. The control system 110 can comprise a microcontroller 112, one or more memory 132, an impact sensor 134, and a user interface 120. The memory 132, the impact sensor 134, and the user interface 120 are operationally related to the microcontroller 112.

In an exemplary embodiment, the user interface 120 can comprise one or more of the following: a display 122, GPIO 124, camera 126, amplifier/speaker 128, microphone 130, or other features as may be required and/or desired in a particular embodiment. Such user interface 120 interactions with player 302 can use graphical displays, combinations of lights, use of AMAZON ALEXA or other similar listen-and-talk technology, or other user interface interactions. Different languages can be spoken and displayed. In addition, sign language can be displayed on the display to make the present invention usable by game players who are hearing impaired.

In an exemplary embodiment, the volume level can be manually adjustable by game players 302 in low, medium, and high typed fixed settings or adjustable in a more variable type of adjustable volume control.

The memory can be encoded with instructions that when executed by the microcontroller perform the steps of detecting a person 302 catching the soft shell 102 by way of the impact sensor 134. Presenting game player 306 with a question by way of the user interface 120. Receiving an answer from game player 306 by way of the user interface 120. Determining if the answer is correct or incorrect by way of the control system 110 voice processing and/or other techniques locally and/or remotely data communication accessible to the control system 110. And, prompting game player 306 to toss the plushy 100 to another game-playing person 306 to continue the game.

In an exemplary embodiment, the control system 110 can receive data related to content for a game such as questions from the remote data processing resource, and other data as may be required and/or desired in a particular embodiment. In another embodiment, the control system 110 can receive data related to content for a game including questions from interchangeable memory 132 such as USB flash, SD cards, micro-SD cards, thumb drive, memory cartridges, and other types and kinds of interchangeable memory that can be plugged into and removed from the control system 110.

In an exemplary embodiment, the game can be based on a time period or limit, a number of questions in a round or game, a scoring limit such as a first person to reach a preset score, or other gameplay features as may be required and or desired in a particular embodiment.

Referring to FIG. 7 there is illustrated one example of a database structure for the learning game system and methods of the present invention. In an exemplary embodiment, at least one database 206A/206B can be implemented on at least one of the data processing resources 202, or server 202, or computing device 222. In operation, such one or more databases 206A/206B can be accessed/created/managed/maintained as appropriate and authorized by more than one stakeholder. In this regard, in addition to system administrators and other authorized persons, other stakeholders that can access/create/manage/maintain as appropriate at least parts of the learning game system databases can include parents, caregivers, and others 302, administrators, educators, and others 304, and gameplayers 306 as appropriate and authorized.

In an exemplary embodiment, such databases 206A/206B can be SQL, MYSQL, MARIADB, ORACLE, MS ACCESS, network-accessible storage, flat files, a combination thereof, or other types and kinds of databases.

In an exemplary embodiment, the learning game database 600 can comprise a series of tables, records, fields, and accounts that include account record 602, module record 604, task record 606, classroom record 608, question record 610 also referred to as the question-and-answer database 610, skill level record 612, store inventory record 614, gameplay record 616, and/or other types or kinds of records as may be required and/or desired in a particular embodiment. The interconnecting lines between certain fields within certain records 602/604/606/608/610/612/614 illustrate the data relationships between some of the fields and records.

In operation, account record 602 can comprise information related to the user, plushy 100 details, payment information, past game play results including the answer files, and other information. The learning module record 604 can comprise available learning modules for gameplay including those learning modules that were free, purchased, and/or access acquired in other ways. With reference to at least FIG. 16 reference 'C", Learning models are characterized as the broader subject such as math, spelling, etc. Task record 606 are more specific task available within the module for the user to access. As an example, the learning module of math might have task such as addition, subtraction, and others. The skill level record 612 are levels of complexity of skill required for each of the tasks. In this regard, skill levels could be beginner, intermediate, advanced, or other skill ranking. The classroom record/recordset 608 comprises a collection of account record information for each student 306 with a plushy 100 in a classroom. The store inventory record 614 is the available online learning modules and pricing information that a user can purchase, acquire, or otherwise link to the account record to expand their learning module library available gameplay selections. The question-and-answer record or database 610 is a repository of questions and answers. And, the gameplay record/recordset 616 is queried based on gameplay module, task, and skill level selections. The gameplay record/recordset 616 is the content downloaded to the plushy to enable gameplay.

Figure 8:
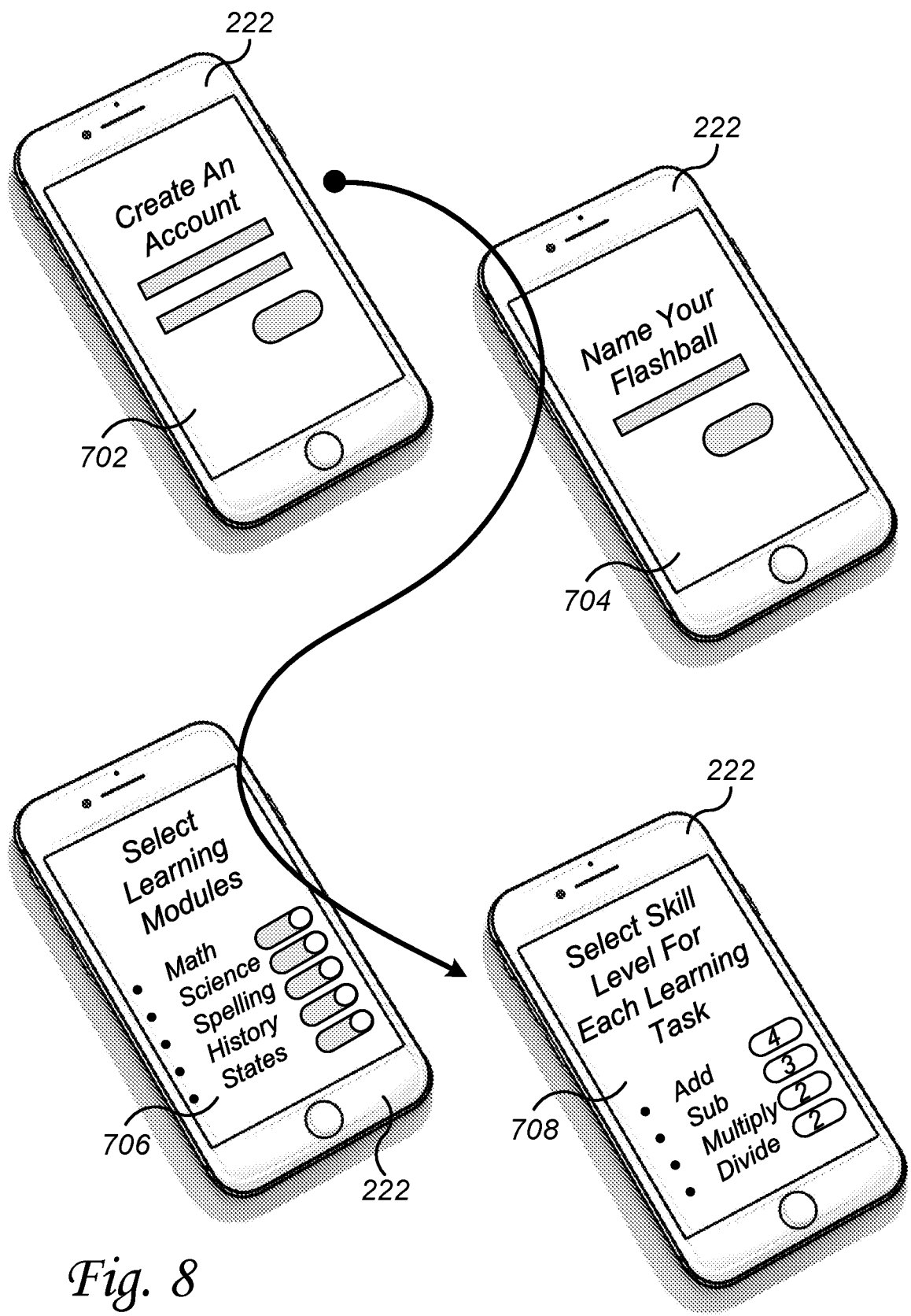
FIGS. 8-11 illustrates examples of configuring the learning game system and methods of use.

Referring to FIG. 8 there are illustrated examples of configuring the learning game system and methods of use. In an exemplary embodiment, in screenshot 702 on computing device 222 and the corresponding step, an account record 602 can be created, by way of a user, on the computing device 222, or the server 202 by way of the computing device 222. Account record 602 comprises a plushy identifier, at least one module field, at least one task field, and at least one skill level field. In operation, the control system 110 can be associated with the plushy identification.

In the next step, in screenshot 704 on computing device 222, user 302/304/306 provided an endearing name for the plushy that can be stored in the plushy identifier field or other suitable field.

In the next step, screenshot 706 on computing device 222, the user 302/304/306 can select one or more learning modules that they would like to add to their profile. Some of the learning modules may be free, some purchased, and other learning modules accessed or otherwise obtained in other ways as may be required and/or desired in a particular embodiment. The user's choices can be stored in the learning module field associated with the account record 602. The library of learning modules that the user 302/304/306 can choose from can be stored in the learning modules record 604, or other suitable location.

In the next step, screenshot 708 on computing device 222, the user 302/304/306 can select one or more task for each of the learning modules selected, and the users 302/304/306 stored in the task field associated with the account record 602. The library of tasks that the user 302/304/306 can choose from can be stored in the task record 606, or other suitable locations.

Figure 9:
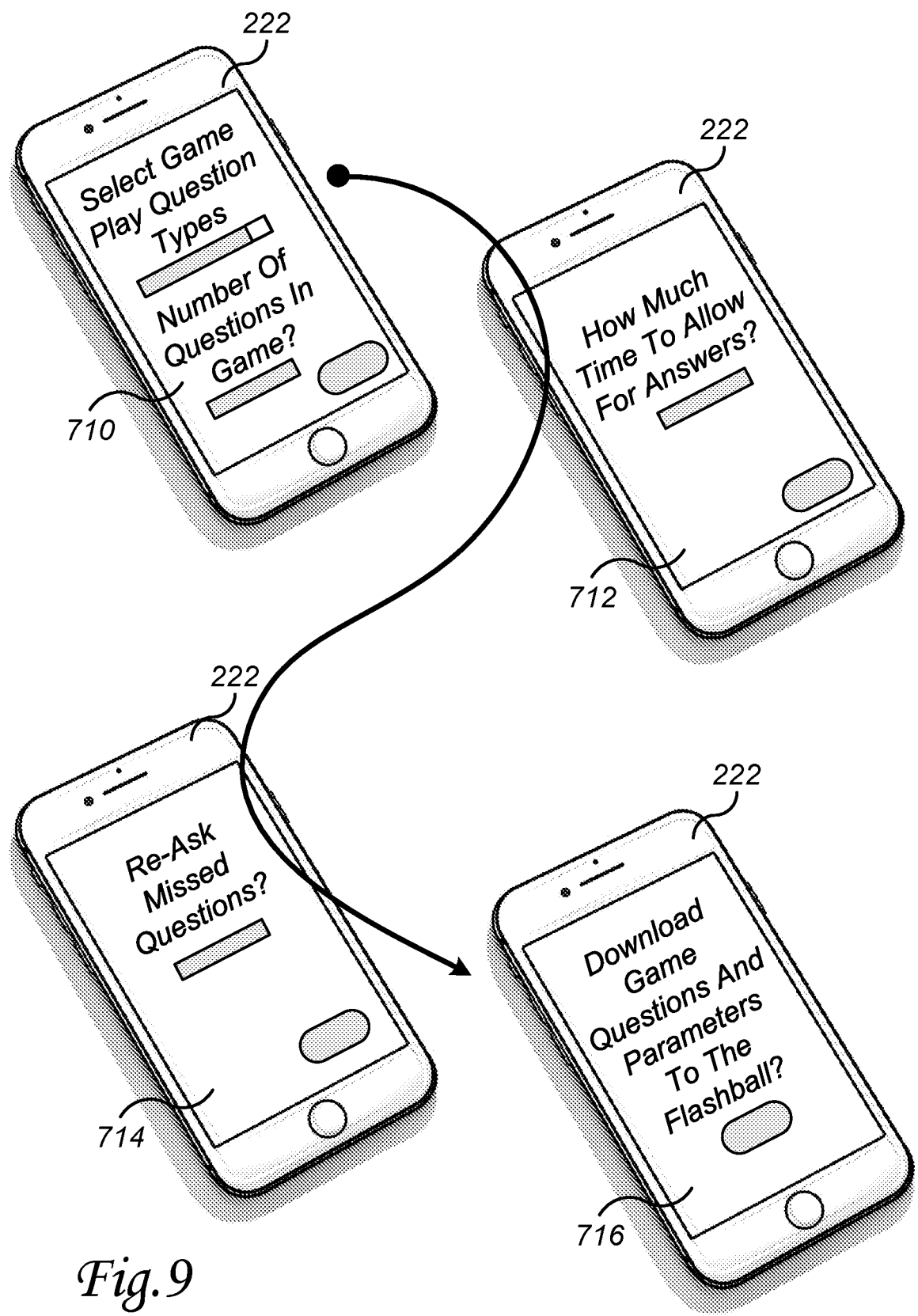

Referring to FIG. 9, there are illustrated examples of configuring the learning game system and methods of use. In an exemplary embodiment, in screenshot 710 on computing device 222, the user 302/304/306 can configure the learning system for gameplay. In this regard, the user 302/304/306 can select game parameters such as the types of kinds of questions, the number of questions in a game, and other parameters for gameplay, as may be required and or desired in a particular embodiment.

In a next step, screenshot 712 on computing device 222, the user 302/304/306 can select how much time a player has to answer the question, and or settings and parameters related to the question asking and answering.

In the next step, screenshot 714 on computing device 222, the user 302/304/306 can configure how missed questions are to be handled. In this regard, the user 302/304/306 can select to queue the questions associated with the incorrect answer to be re-asked during later gameplay, or handled in other ways as may be required and/or desired in a particular embodiment.

In the next step, screenshot 716 on computing device 222, prompts the user 302/304/306, once a game has been configured for play, to download the queries questions based on the criteria selected by the user 302/304/306 to the plushy 100. Such download is by wireless data communication between the computing platform and the plushy 100 control system 110. Such wireless data communication can be by way of Bluetooth, Wifi, or other wireless data communication methods.

In an exemplary embodiment, the computing platform 222 memory 210 B can be encoded with instructions that when executed by the microprocessor 204B configure the learning game system for gameplay by selecting for gameplay from the account record 602, by the user 302/304/306 by way of the computing device 222, at least one gameplay learning module from the learning module field, at least one gameplay task from the task field.

Configuring for gameplay then continues by retrieving from a question-and-answer database 610 a plurality of the questions and the answers based on the gameplay learning module, the gameplay task, and the skill level selected associated with the gameplay task. The question-and-answer database 610 can be stored on the computing device 222 or on the server 202. Then the plurality of the question and the answer are data communicated between the communication interface 210B of the computing device 222 and the communication interface 118 of the control system 110. The plushy 100 is then ready for gameplay.

Figure 10:
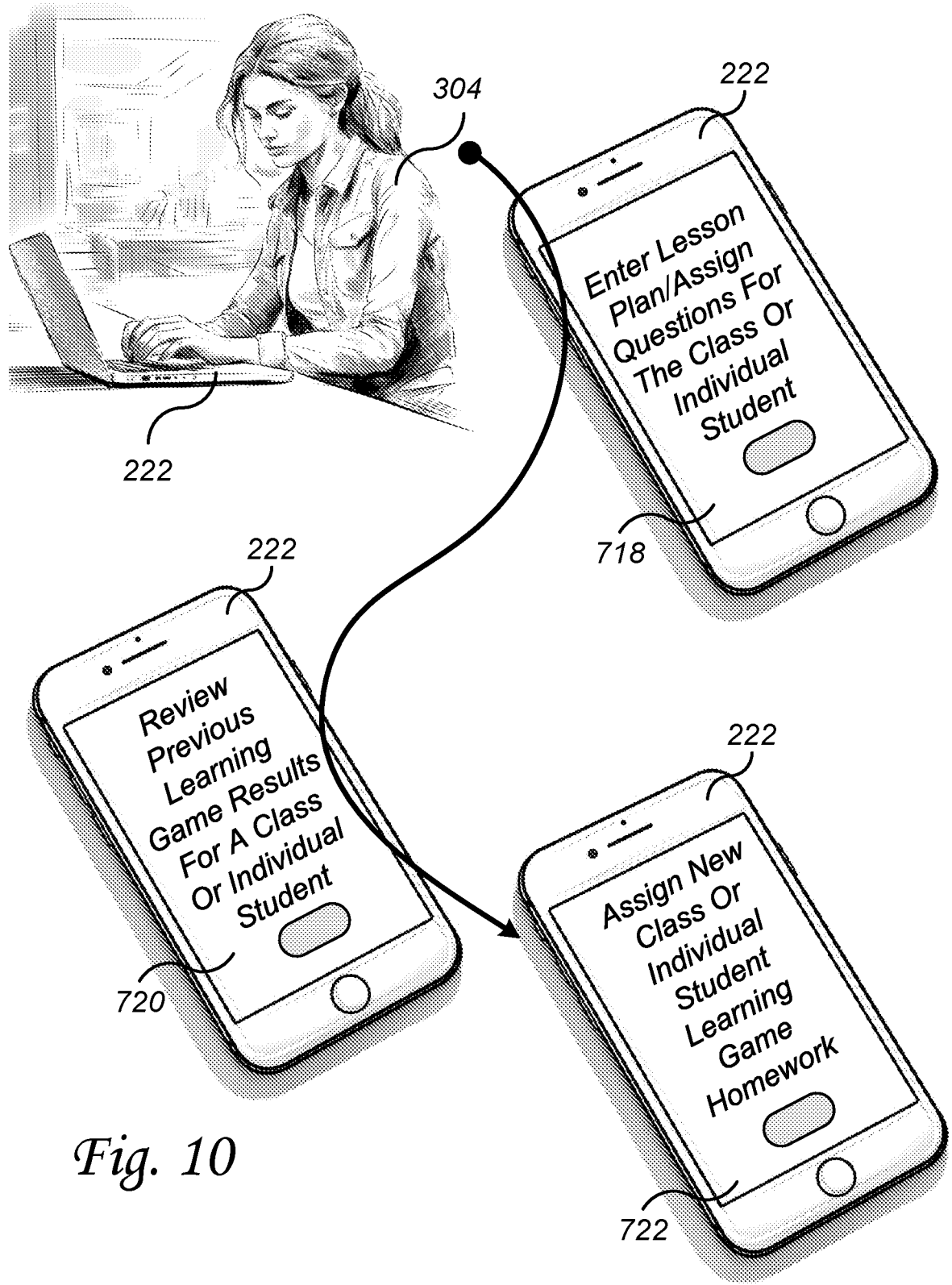

Referring to FIG. 10, there are illustrated examples of configuring the learning game system and methods of use. In an exemplary embodiment, gameplay for classroom gameplay can be configured by an educator 304, or another approved user. In screenshot 718 on computing device 222, the educator 304 by way of a computing device can enter a lesson plan, assignment for the class, or individual student 306. In this regard, class plans and assignments can be broadcast to each of the plushy 100 that are a member of the classroom recordset 608, or suitable other listing which associates a class with a student 306 and plushy 100 that belong to or are used by the student 306. In the alternative, the plan of assignment can be data communicated to an individual student or sub-group of students in the class, as may be required and/or desired in a particular embodiment.

In the next step, in screenshot 720 on computing device 222, educator 304 can review previous learning game results for a classroom of students 306, an individual student 306, or a sub-group of students in the class. Such review can include reading or listening to an answer file of a student which can be a transcript or recording of the student's spoken answers during a game play session. Answer files can be stored as part of the account record 602 or in other suitable locations.

In the next step, in screenshot 722 on computing device 222, the educator 304 can assign homework to a student by selecting learning modules, tasks, and other settings for a classroom of student, an individual student, or a sub-group of students. Once assigned by the educator 304 when the student 306 next uses the plushy 100 outside of class it will be downloaded with the selected questions and answers based on the educator's 304 setting.

Figure 11:
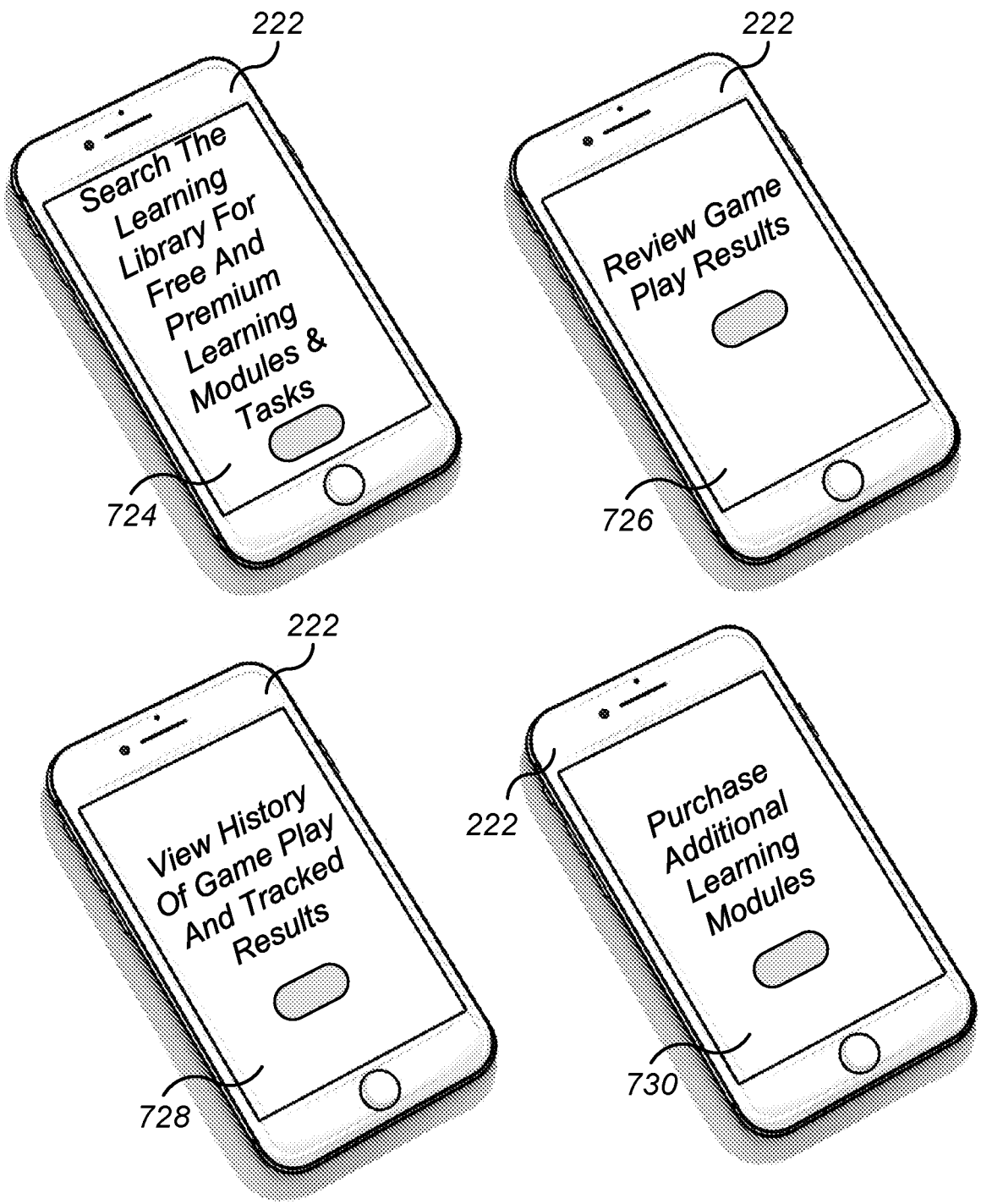

Referring to FIG. 11, there are illustrated examples of configuring the learning game system and methods of use. In an exemplary embodiment, in screenshot 724 on computing device 222, a user 302/304/306 can search a learning library free and premium for sale learning modules and tasks.

In screenshot 726 on computing device 222, the user 302/304/306 can review gameplay results that can include reviewing data uploaded from the plushy 100 to the computing device 222 post gameplay, reviewing questions and answers, reviewing scores, and reviewing other items, as may be required and or desired in a particular embodiment.

In screenshot 728 on computing device 222, the user 302/304/306 can review the history of gameplay and trends, such as tracking the improvement of a game player 306 over time, and other types and kinds of history as may be required and/or desired in a particular embodiment.

In screenshot 730 on computing device 222, the user 302/304/306 can review inventory and purchase additional learning modules and tasks. Once purchased such learning modules and tasks are updated in the account record 602 and become accessible for gameplay.

Figure 12:
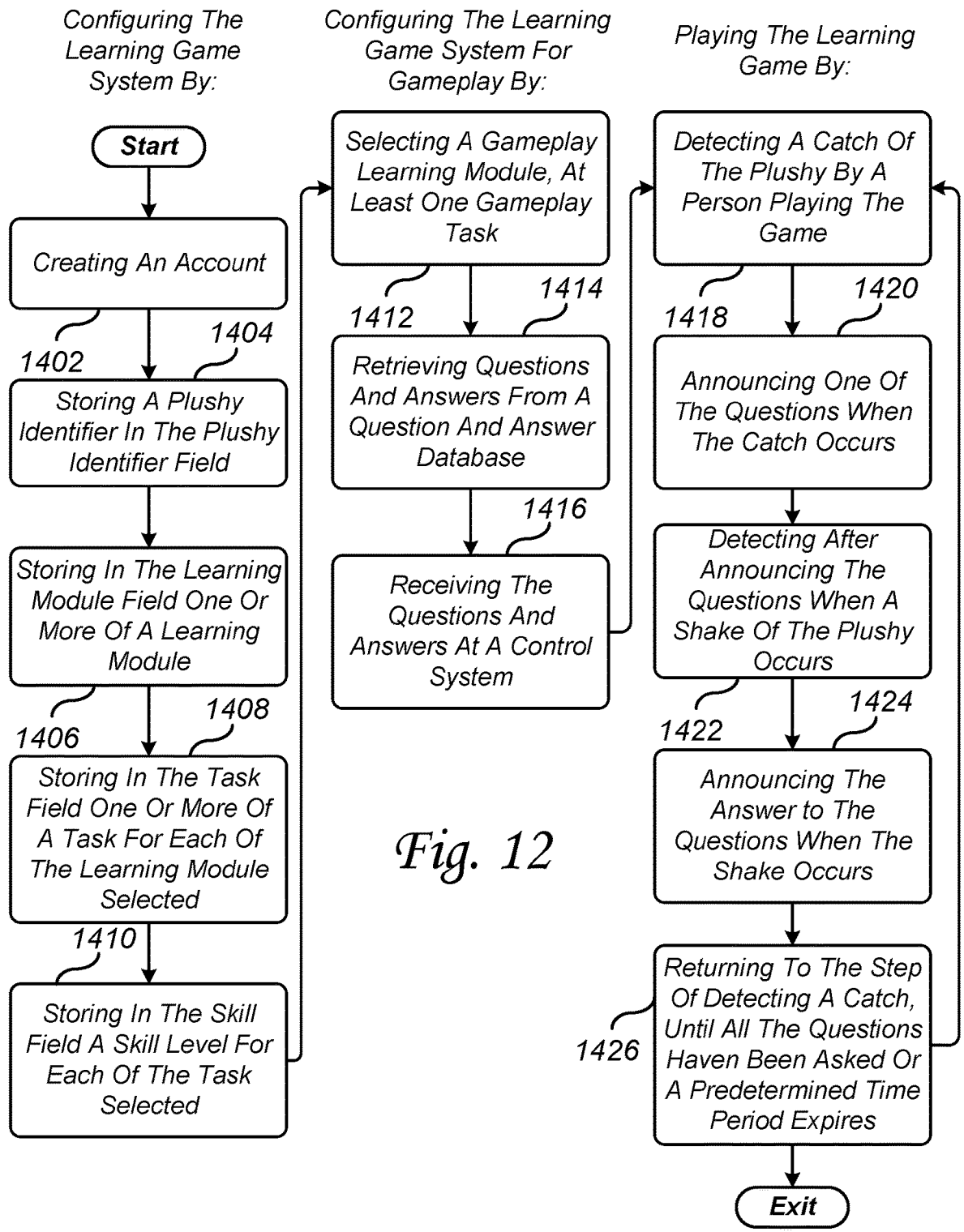
FIG. 12 illustrates one example of a method of use of learning game system.

Referring to FIG. 12, there is illustrated one example of a method of use of a learning game system. The method begins by configuring the learning game system. In this regard, in step 1402 an account record 602 is created by the user 302/304/306 on a computing device 222 or a server 202 by way of the computing device 222. Account record 602 comprises a plushy identifier field, at least one module field, at least one task field, and at least one skill level field. The method then moves to step 1404.

In step 1404, by way of the computing device, 222 a plushy identification is stored in the plushy identifier field. Such plushy 100 identification can be one or more of a user-selected name for the plushy 100, a unique assigned identification that uniquely identifies the plushy 100, or other types and kinds of identification, as may be required and/or desired in a particular embodiment. The method then moves to step 1406.

In step 1406, user 302/304/306 selects one or more learning modules stored in the learning module field. These are the learning modules that will be accessible for gameplay. The method then moves to step 1408.

In step 1408, user 302/304/306 selected one or more tasks for each of the learning modules selected are stored in the task field. These are the tasks for which the learning module that will be accessible for gameplay. The method then moves to step 1410.

In step 1410, a skill level is selected by the user 302/304/306 for each of the tasks selected and stored in the skill level field. The skill relates to the difficulty of the questions that will be queried for gameplay. As an example, beginner, intermediate, advanced, or level 1, 2, 3, or other skill level ranking methods. The method then moves to step 1412.

Beginning in step 1412, the learning game system is configured for gameplay. In this regard, in step 1412 the user 302/304/306 by way of the computing device 222 selects from the account record 602 at least one gameplay learning module from the learning module field, and at least one gameplay task from the task field. The method then moves to step 1414.

In step 1414, a plurality of the questions and the answers are retrieved from the question-and-answer database 610 based on the gameplay learning module, the gameplay task, and the skill level selected associated with the gameplay task. The questions and answers database 610 is stored on the computing device 222 or on the server 202. The method then moves to step 1416.

In step 1416, at least one of the questions and at least one of the answers is received at the control system 110 from the computing device 222 or the server 202. The control system 110, the computing device 222, and the server 202 data communicate with each other. A plushy 100 has an internal chamber 104. The control system 110 is associated with the plushy identification and fitted into the internal chamber 104. The control system 110 comprises a microcontroller 112, a memory 132, a communication interface 118, an impact sensor 134, and an audio amplifier that is operationally related to a speaker, amplifier/speaker 128. The memory 132, the communication interface 118, the impact sensor 134, and the audio amplifier 128 are operationally related to the microcontroller 112. The method then moves to step 1418.

Playing the learning game system starts begins in step 1418 by detecting, by way of the impact sensor 134, a catch of the plushy 100 by at least one person 306 who is playing. The method then moves to step 1420.

In step 1420, when the catch occurs, by way of the speaker, one of the questions is announced. The method then moves to step 1422.

In step 1422, after announcing one of the questions a pause occurs waiting for the detection of a shake of the plushy by the person playing. The shake being detected by way of the impact sensor 134. The method then moves to step 1424.

In step 1424, when the shake occurs, by way of the speaker, the answer to the question is announced. The method then moves to step 1426.

In step 1426, the game continued by returning to step 1418 of detecting, by way of the impact sensor 134, the catch of the plushy. In operation, questions and answers gameplay continues by repeatedly tossing and catching the plushy between each of the people playing, until all of the questions have been asked or a predetermined time period expires. The method is then exited.

Figure 13:
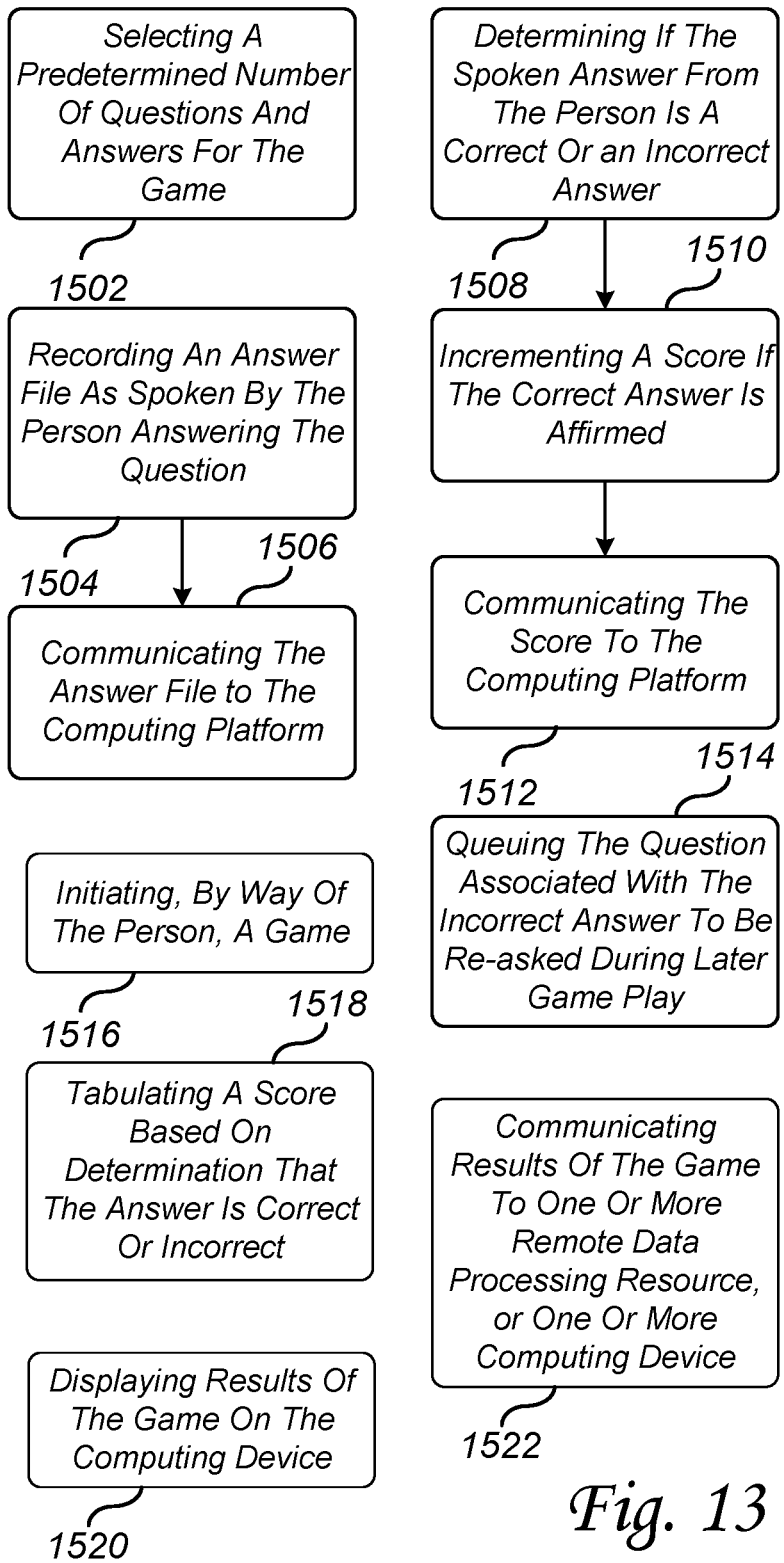
FIG. 13 illustrates exemplary embodiments that can be used interchangeably with the methods of the present invention.

Referring to FIG. 13, there are illustrated exemplary embodiments that can be used interchangeably with the methods of the present invention.

In step 1502, by the user 302/304/306 by way of the computing device 222, a predetermined number of questions and answers for gameplay can be selected.

In step 1504, an answer file as spoken by the person answering the question can be recorded by way of a microphone 130. The control system 110 comprises the microphone 130. The microphone 130 is operationally related to the microcontroller 112. The answer file comprises the question in text or audible format and the answer in audible format or converted text from the audible format. The method then moves to step 1506.

In step 1506, the answer file is data communicated to the computing platform 222 by way of the communication interface 118. In operation, the answer file is stored and associated with the account record 602 so that it can be retrieved for use and/or review at future times.

In step 1508, a determination is made if a spoken answer from the person is a correct answer or an incorrect answer by way of a microphone 130 and speech processing by way of the control system 110 comparing the spoken answer to the answer. The control system 110 comprises the microphone 130. The microphone 130 is operationally related to the microcontroller 112. The method then moves to step 1510.

In step 1510, a score is incremented if the correct answer is affirmed by the control system 110. The method then moves to step 1512.

In step 1512, the score is data communicated to the computing platform 110 by way of the communication interface 118. In operation, the score is stored and associated with the account record 602 so that it can be retrieved for use and review at future times.

In step 1514, the questions associated with the incorrect answer can be queued to be re-asked during later gameplay. In this regard, gameplayers 306 can be re-asked missed questions later in the game.

In step 1516, a game can be initiated by way of a user 302/304/306.

In step 1518, a score can be tabulated based on the determination that the answer is correct or incorrect.

In step 1520, the results of the game can be displayed on computing device 222.

In step 1522 by way of a communication interface 118, the results of the game can be data communicated to one or more remote data processing resources 202, or one or more computing devices 222, the control system 110 further comprises the communication interface 118. The communication interface 118 is operationally related to the microcontroller 112 and as such the control system 110.

Figure 14:
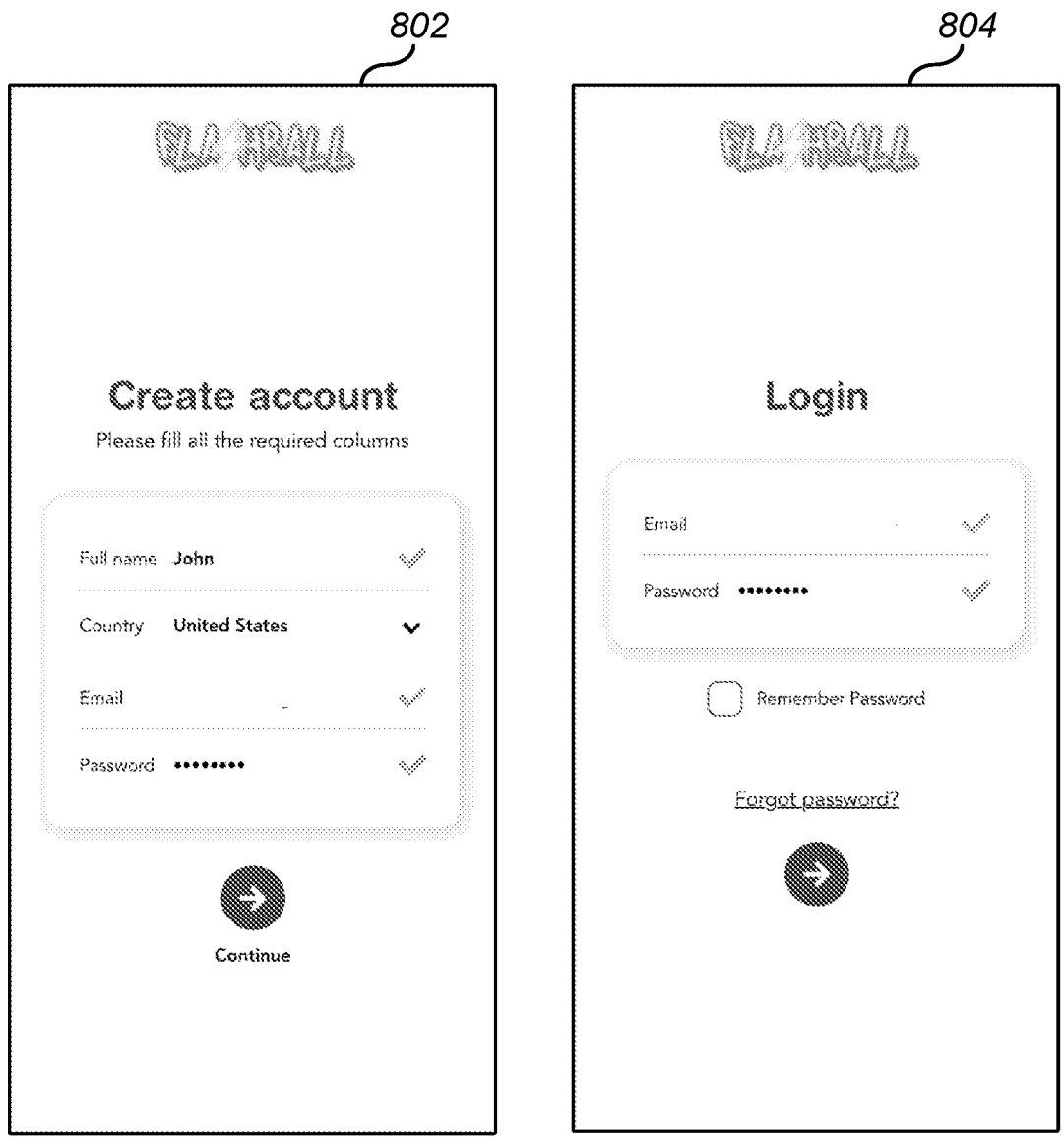
FIGS. 14-16 illustrates screenshots of the software application of the present invention that operates on the computing platform.

Referring to FIG. 14, there is illustrated one example of screenshots of the software application of the present invention that operates on the computing platform 222. In an exemplary embodiment, screenshot 802 allows a user to create an account and screenshot 804 allows the user to login into the account.

Figure 15:
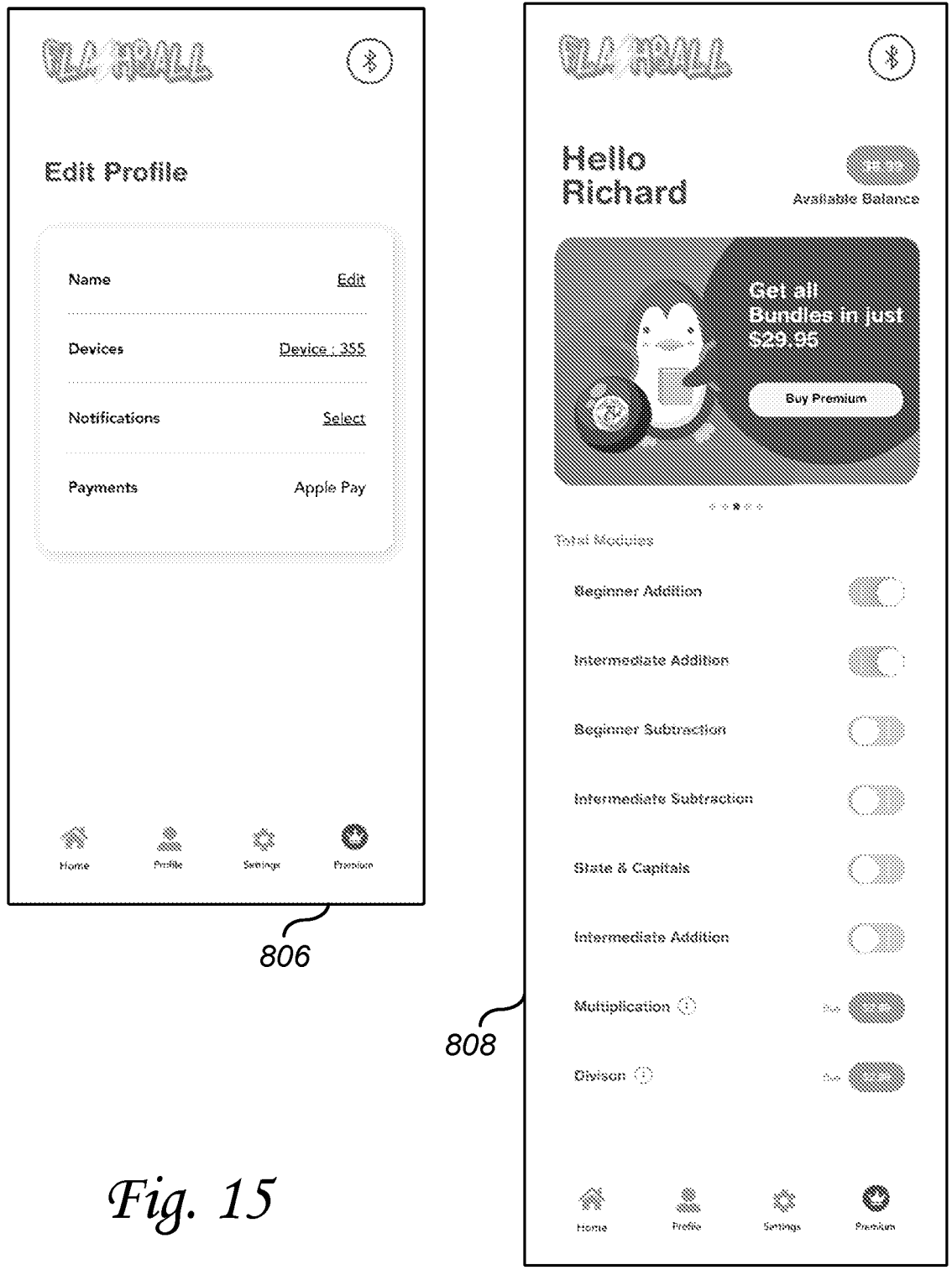

Referring to FIG. 15, there is illustrated one example of screenshots of the software application of the present invention that operates on the computing platform 222. In an exemplary embodiment, screenshot 806 allows a user to edit their account, and screenshot 808 allows the user to select and/or purchase learning modules or tasks.

Figure 16:
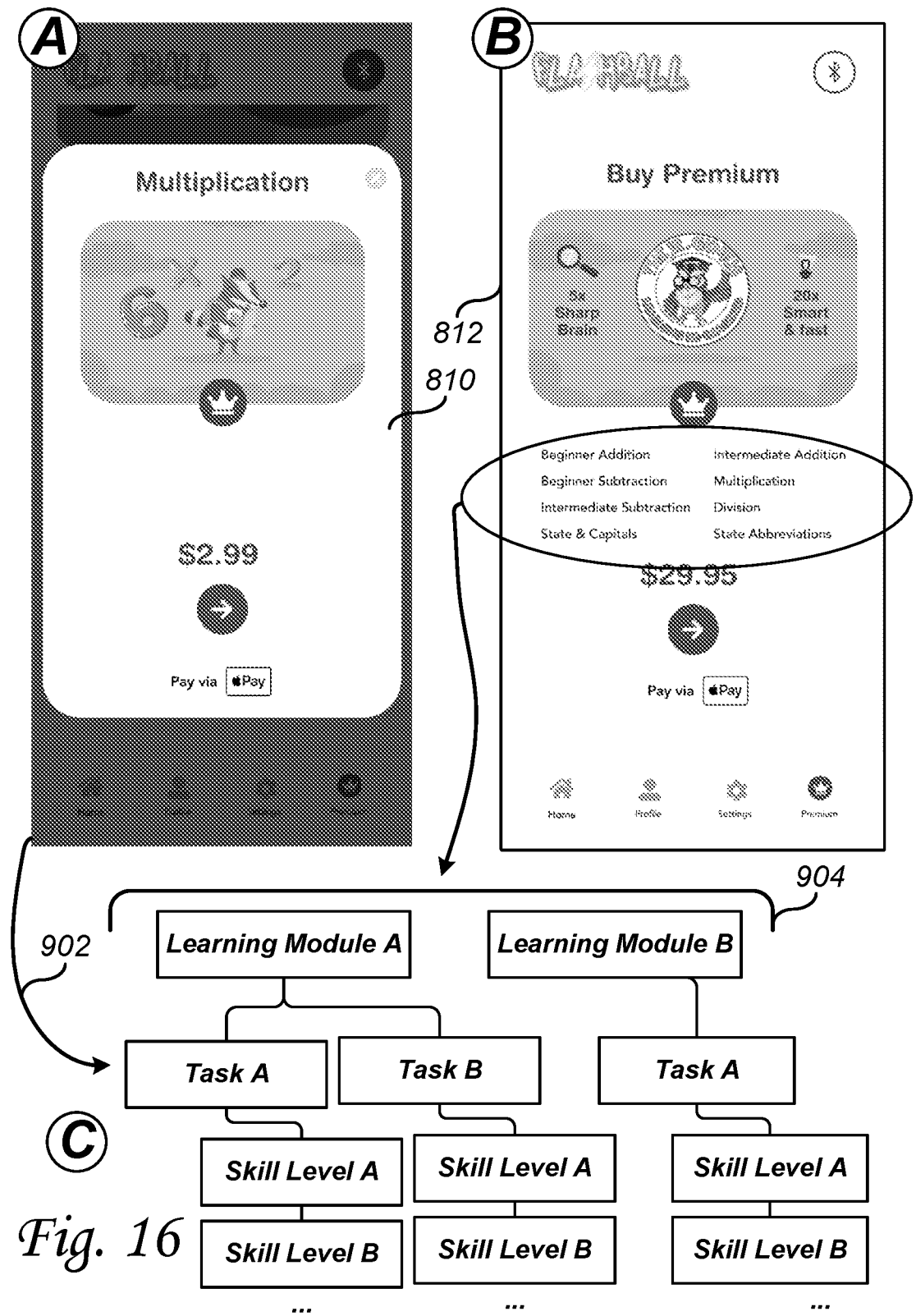

Referring to FIG. 16, there is illustrated one example of screenshots of the software application of the present invention that operates on the computing platform 222.

In an exemplary embodiment, in reference 'A' screenshot 810 allows a user to purchase a task such as multiplication. Reference 902 indicates where tasks fall in the hierarchy of gameplay content. In this regard reference 'C' illustrates how tasks fall under learning modules, and under each task are questions and answers that are sorted based on skill level such as skill level A, skill level B, and so on, so that no matter what the gameplayer's 306 knowledge level is there are always meaningful and challenge gameplay question that is appropriate.

In an exemplary embodiment, in reference 'B' screenshot 812 illustrates how the user 302/304/306 can purchase a learning module or multiple learning modules in which the tasks are part of the purchase. In this regard, reference 904 indicates how the learning module(s) purchase can include the task and skill level in the complete purchase.

Figure 17:
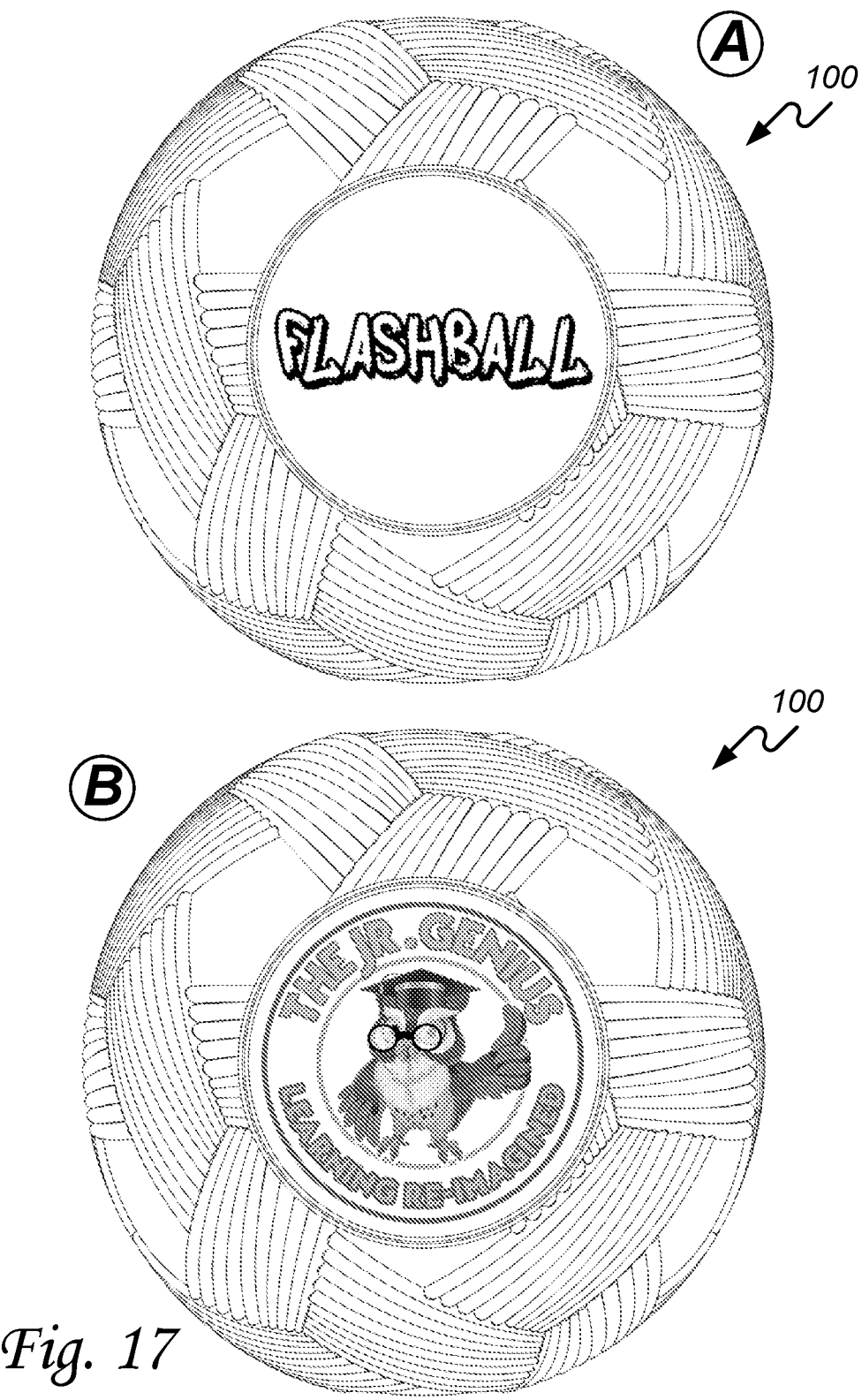
FIG. 17 illustrates a front view and a back view of the plushy.
Figure 18:
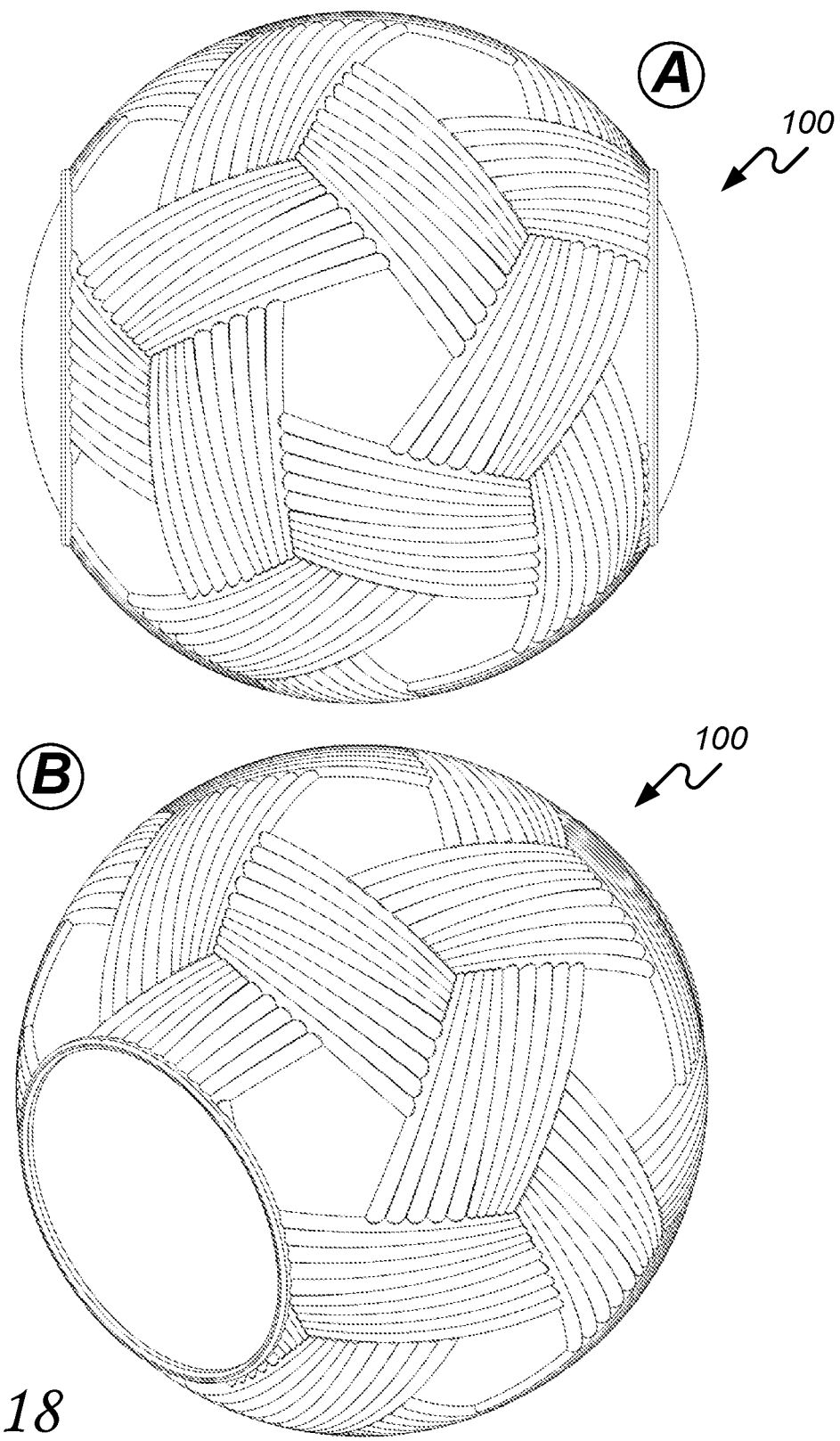
FIG. 18 illustrates a top view, a bottom view, and a perspective view of the plushy.

Referring to FIG. 17, there is illustrated in reference 'A' a front view and in reference 'B' a back view of the plushy 100. Referring to FIG. 18, there is illustrated in reference 'A' a top and bottom view of plushy 100. The top and bottom views are the same. And, in reference 'B' a perspective view of the plushy 100.

The capabilities of the present invention can be implemented in software, firmware, hardware, or some combination thereof.

As one example, one or more aspects of the present invention can be included in an article of manufacture (e.g., one or more computer program products) having, for instance, computer-usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A learning game system comprising:
a plushy having an internal chamber; and
a control system is fitted into the internal chamber, the control system comprises a microcontroller, a first memory, a first communication interface, an impact sensor, and an audio amplifier that is operationally related to a speaker, the first memory, the first communication interface, the impact sensor, and the audio amplifier are operationally related to the microcontroller;
a computing device is operated by a user external to the plushy, the computing device comprises a microprocessor, a second memory, and a second communication interface, the second memory, and the second communication interface are operationally related to the microprocessor, the control system by way of the first communication interface data communicates with the computing device, and the computing device data communicates with a server;
the second memory is encoded with instructions that when executed by the microprocessor perform the steps of:
  selecting, by the user, a gameplay learning module for gameplay by way of the computing device;
  selecting, by the user, a gameplay task, the gameplay learning module comprises and is associated with the gameplay task;
  assigning, by the user, a gameplay skill level associated with the gameplay task, the gameplay skill level is based on education level of a person playing the game, the gameplay task comprises and is associated with the gameplay skill level;
  selecting, by the user, a number of a question to set duration of gameplay; and
  querying the number of the question and an answer for each of the question, by way of the second communication interface, from the server, based on query criteria of at least the gameplay learning module, the gameplay task, and the gameplay skill level;
the first memory is encoded with instructions that when executed by the microcontroller perform the steps of:
  receiving from the computing device, by way of the first communication interface, each of the question and each of the answer, wherein, after receiving, the control system facilitates gameplay absent further data communication with the computing device or the server;
  playing the learning game system by:
    detecting, by way of the impact sensor, a catch of the plushy by at least one of the person who is playing;
    announcing when the catch occurs, by way of the speaker, one of the question;
    detecting after announcing one of the question, by way of the impact sensor, a shake of the plushy by the person;

announcing when the shake occurs, by way of the speaker, the answer to the question; and returning to the step of detecting, by way of the impact sensor, the catch of the plushy, until all of the question have been asked;

wherein question-and-answer gameplay continues by repeatedly tossing and catching the plushy between each of the person playing.

2. The learning game system in accordance with claim 1, the second memory is encoded with instructions that when executed by the microprocessor perform the steps of:

configuring the learning game system by:

creating, by way of a user, an account record, on the computing device or on the server by way of the computing device, the account record comprises a plushy identifier, at least one of a module field, at least one of a task field, and at least one of a skill level field, the control system is associated with the plushy identification;

storing the user provided name of the plushy in the plushy identifier field;

storing in the learning module field the user selected one or more of a learning module;

storing in the task field the user selected one or more of a task for selected each of the learning module selected; and storing in the skill level field a skill level selected by the user for each of the task selected.

3. The learning game system in accordance with claim 2, the first memory is encoded with instructions that when executed by the microcontroller perform the steps of:

determining if a spoken answer from the person is a correct answer or an incorrect answer by way of a microphone and speech processing by way of the control system comparing the spoken answer to the answer, the control system comprises the microphone, the microphone is operationally related to the microcontroller;

incrementing a score if the correct answer is affirmed by the control system; and communicating the score to the computing platform, by way of the first communication interface, wherein the score is stored and associated with the account record so that it can be retrieved at future times.

4. The learning game system in accordance with claim 3, the first memory is encoded with instructions that when executed by the microcontroller perform the step of:

queuing the question associated with the incorrect answer to be re-asked during later gameplay.

5. The learning game device in accordance with claim 2, wherein the game is based on at least one of the following: predetermined number of the question, or reaching a predetermined score.

6. The learning game system in accordance with claim 1, the second memory is encoded with instructions that when executed by the microprocessor perform the steps of:

configuring the learning game system by:

creating, by way of a user, an account record, on the computing device or on the server by way of the computing device, the account record comprises a plushy identifier field, at least one of a module field, at least one of a task field, and at least one of a skill level field, the control system is associated with the plushy identification;

storing in the plushy identifier field a plushy identification;

storing in the learning module field the user selected one or more of a learning module;

storing in the task field the user selected one or more of a task for selected each of the learning module selected; and storing in the skill level field a skill level selected by the user for each of the task selected.

7. The learning game system in accordance with claim 6, the second memory is encoded with instructions that when executed by the microprocessor perform the step of:

prompting the user to configure the learning game system by way of the computing platform.

8. The learning game system in accordance with claim 7, the first memory is encoded with instructions that when executed by the microcontroller perform the steps of:

recording an answer file as spoken by the person answering the question, by way of a microphone, the control system comprises the microphone, the microphone is operationally related to the microcontroller, the answer file comprises the question in text or audible format, and the answer in audible format or converted text from the audible format; and communicating the answer file to the computing platform by way of the first communication interface, wherein the answer file is stored and associated with the account record so that it can be retrieved at future times.

9. The learning game system in accordance with claim 6, the second memory is encoded with instructions that when executed by the microprocessor perform the steps of:

configuring the learning game system for remote classroom learning by:

creating a classroom recordset that comprises plurality of the account record, each of the account record in the classroom recordset corresponds to one of the person in a classroom, the classroom is administered by an educator;

selecting for gameplay, by the educator, by way of the computing device, at least one of the gameplay learning module, at least one of the gameplay task that is associated with the gameplay learning module, and at least one of the gameplay skill level that is associated with the gameplay task;

retrieving from a question-and-answer database plurality of the question and the answer based on the gameplay learning module, the gameplay task, and the gameplay skill level selected, the question-and-answer database is stored on the computing device or on the server; and communicating plurality of the question and the answer to each of the control system associated with each of the unique plushy identification within the classroom recordset.

10. The learning game system in accordance with claim 1, the second memory is encoded with instructions that when executed by the microprocessor perform the steps of:

selecting, by the user, whether or not to re-ask the question when the associated answer is incorrectly answered by the person during gameplay.

11. The learning game system in accordance with claim 1, the impact sensor is an accelerometer.

12. A learning game system comprising:

a plushy having an internal chamber; and a computing device is operated by a user external to the plushy, the computing device comprises a microprocessor, a first memory, and a first communication interface, the first memory and the first communication interface are operationally related to the microprocessor, the first memory is encoded with instructions that when executed by the microprocessor perform the steps of:

configuring the learning game system by:
  creating, by way of the user, an account record on the computing device or on a server by way of the computing device, the account record comprises a plushy identifier field, at least one of a module field, at least one of a task field, and at least one of a skill level field;
  storing in the plushy identifier field a unique plushy identification;
  storing in the learning module field the user selected one or more of a learning module;
  storing in the task field the user selected one or more of a task for selected each of the learning module selected; and
  storing in the skill level field a skill level selected by the user for each of the task selected, the skill level is associated with education level of at least one of a person who is playing;
configuring the learning game system for gameplay by:
  selecting for gameplay from the account record, by the user by way of the computing device, at least one of a gameplay learning module from the learning module field;
  selecting, by the user, at least one of a gameplay task from the task field, the gameplay learning module comprises and is associated with the gameplay task;
  selecting, by the user, a number of a question to set duration of gameplay;
  assigning, by the user, a gameplay skill level associated with the gameplay task, the gameplay skill level is based on education level of a person playing the game, the gameplay task comprises and is associated with the gameplay skill level;
  retrieving from a question-and-answer database the number of the question and the answer based on query criteria of the gameplay learning module, the gameplay task, and the skill level selected, the question-and-answer database is stored on the computing device or on the server;
a control system is associated with the plushy identification and is fitted into the internal chamber, the control system comprises a microcontroller, a second memory, a second communication interface, an impact sensor, and an audio amplifier that is operationally related to a speaker, the second memory, the second communication interface, the impact sensor, and the audio amplifier are operationally related to the microcontroller, the second memory is encoded with instructions that when executed by the microcontroller perform the steps of:
  receiving each of the question and each of the answer by way of the second communication interface from the first communication interface, wherein after receiving, the control system facilitates gameplay absent further data communication with the computing device or the server;
playing the learning game system by:
  detecting, by way of the impact sensor, a catch of the plushy by at least one of the person who is playing;
  announcing when the catch occurs, by way of the speaker, one of the question;
  detecting after announcing one of the question, by way of the impact sensor, a shake of the plushy by the person;
  announcing when the shake occurs, by way of the speaker, the answer to the question; and
  returning to the step of detecting, by way of the impact sensor, the catch of the plushy, until all of the question have been asked;
  wherein question-and-answer gameplay continues by repeatedly tossing the plushy between each of the person playing.

13. The learning game system in accordance with claim 12, further comprising:
  the first memory is encoded with instructions that when executed by the microprocessor perform the steps of:
    selecting, by the user, whether or not to re-ask the question when the associated answer is missed during gameplay.

14. The learning game system in accordance with claim 12, further comprising:
  the second memory is encoded with instructions that when executed by the microcontroller perform the steps of:
    recording an answer file as spoken by the person answering the question, by way of a microphone, the control system comprises the microphone, the microphone is operationally related to the microcontroller, the answer file comprises the question in text or audible format and the answer in audible format or converted text from the audible format; and
    communicating the answer file to the computing platform by way of the second communication interface, wherein the answer file is stored and associated with the account record so that it can be retrieved at future times.

15. The learning game system in accordance with claim 12, further comprising:
  the second memory is encoded with instructions that when executed by the microcontroller perform the steps of:
    determining if a spoken answer from the person is a correct answer or an incorrect answer by way of a microphone and speech processing by way of the control system comparing the spoken answer to the answer, the control system comprises the microphone, the microphone is operationally related to the microcontroller;
    incrementing a score if the correct answer is affirmed by the control system; and
    communicating, by way of the second communication interface, the score to the computing platform, wherein the score is stored and associated with the account record so that it can be retrieved at future times.

16. The learning game system in accordance with claim 15, further comprising:
  the second memory is encoded with instructions that when executed by the microcontroller perform the step of:
    queuing the question associated with the incorrect answer to be re-asked during later gameplay.

17. A method of using a learning game system, the method comprising the steps of:
  configuring a learning game system by:
    creating, by way of a user, an account record, on a computing device or on a server by way of the computing device, the account record comprises a plushy identifier field, at least one of a module field, at least one of a task field, and at least one of a skill level field;

storing, by way of the computing device, in the plushy identifier field a plushy identification;

storing in the learning module field the user selected one or more of a learning module;

storing in the task field the user selected one or more of a task for selected each of the learning module selected; and storing in the skill level field a skill level selected by the user for each of the task selected;

configuring the learning game system for gameplay by:

selecting, by the user, a gameplay learning module for gameplay by way of the computing device;

selecting, by the user, a gameplay task, the gameplay learning module comprises and is associated with the gameplay task;

assigning, by the user, a gameplay skill level associated with the gameplay task, the gameplay skill level is based on education level of a person playing the game, the gameplay task comprises and is associated with the gameplay skill level;

selecting, by the user, a number of a question to set duration of gameplay; and querying the number of the question and an answer for each of the question, by way of the second communication interface, from the server, based on query criteria of at least the gameplay learning module, the gameplay task, and the gameplay skill level;

receiving each of the question and each of the answer at a control system from the computing device, wherein, after receiving, the control system facilitates gameplay absent further data communication with the computing device or the server, a plushy having an internal chamber, the control system is associated with the plushy identification and fitted into the internal chamber, the control system comprises a microcontroller, a memory, a communication interface, an impact sensor, and an audio amplifier that is operationally related to a speaker, the memory, the communication interface, the impact sensor, and the audio amplifier are operationally related to the microcontroller;

playing the learning game system by:

detecting, by way of the impact sensor, a catch of the plushy by at least one of a person who is playing;

announcing when the catch occurs, by way of the speaker, one of the question;

detecting after announcing one of the question, by way of the impact sensor, a shake of the plushy by the person;

announcing when the shake occurs, by way of the speaker, the answer to the question; and returning to the step of detecting, by way of the impact sensor, the catch of the plushy, until all of the question have been asked;

wherein question-and-answer gameplay continues by repeatedly tossing and catching the plushy between each of the person playing.

18. The learning game method in accordance with claim 17, further comprising the step of:

selecting, by the user, whether or not to re-ask the question when the associated answer is missed during gameplay.

19. The learning game method in accordance with claim 17, further comprising the step of:

recording an answer file as spoken by the person answering the question, by way of a microphone, the control system comprises the microphone, the microphone is operationally related to the microcontroller, the answer file comprises the question in text or audible format and the answer in audible format or converted text from the audible format; and communicating the answer file to the computing platform by way of the communication interface, wherein the answer file is stored and associated with the account record so that it can be retrieved at future times.

20. The learning game method in accordance with claim 17, further comprising the step of:

determining if a spoken answer from the person is a correct answer or an incorrect answer by way of a microphone and speech processing by way of the control system comparing the spoken answer to the answer, the control system comprises the microphone, the microphone is operationally related to the microcontroller;

incrementing a score if the correct answer is affirmed by the control system; and communicating the score to the computing platform by way of the first communication interface, wherein the score is stored and associated with the account record so that it can be retrieved at future times.

21. The learning game method in accordance with claim 17, further comprising the step of:

queuing the question associated with the incorrect answer to be re-asked during later gameplay.

22. The learning game method in accordance with claim 17, further comprising the step of:

configuring the learning game system for remote classroom learning by:

creating a classroom recordset that comprises plurality of the account record, each of the account record in the classroom recordset corresponds to one of the person in a classroom, the classroom is administered by an educator;

selecting for gameplay by the educator by way of the computing device, at least one of the gameplay learning module, at least one of the gameplay task that is associated with the gameplay learning module, and at least one of the gameplay skill level that is associated with the gameplay task;

retrieving from a question-and-answer database plurality of the question and the answer based on the gameplay learning module, the gameplay task, and the gameplay skill level selected, the question-and-answer database is stored on the computing device or on the server; and communicating plurality of the question and the answer to each of the control system associated with each of the plushy identification within the classroom recordset.

* * * * *